(12) United States Patent
Das

(10) Patent No.: US 7,669,471 B2
(45) Date of Patent: Mar. 2, 2010

(54) MULTI-FUNCTION FLOW TESTER

(75) Inventor: Mohan Das, Plainview, NY (US)

(73) Assignee: Netech Corporation, Farmingdale, NY (US)

( * ) Notice: Subject to any disclaimer, the term of this patent is extended or adjusted under 35 U.S.C. 154(b) by 0 days.

(21) Appl. No.: 12/214,027

(22) Filed: Jun. 16, 2008

(65) Prior Publication Data

US 2009/0031797 A1 Feb. 5, 2009

Related U.S. Application Data

(60) Provisional application No. 60/934,565, filed on Jun. 14, 2007.

(51) Int. Cl.
*G01F 3/24* (2006.01)
*F16K 37/00* (2006.01)
(52) U.S. Cl. ............................. 73/223; 73/219; 137/554
(58) Field of Classification Search .................... 73/219, 73/223
See application file for complete search history.

(56) References Cited

U.S. PATENT DOCUMENTS

| | | | | |
|---|---|---|---|---|
| 3,960,295 A * | 6/1976 | Horak | ...................... | 222/145.6 |
| 4,433,577 A * | 2/1984 | Khurgin et al. | ........... | 73/290 V |
| 5,226,447 A * | 7/1993 | Burley | ......................... | 137/554 |
| 6,434,772 B1 * | 8/2002 | Barbe | ............................. | 8/158 |
| 7,392,698 B2 * | 7/2008 | Zalite et al. | ................... | 73/220 |
| 2003/0009428 A1 * | 1/2003 | Barbe | ......................... | 705/413 |
| 2003/0056565 A1 * | 3/2003 | Barbe | ......................... | 73/1.59 |

* cited by examiner

*Primary Examiner*—Harshad Patel
(74) *Attorney, Agent, or Firm*—David Aker

(57) ABSTRACT

A fluid flow tester for measuring minute volumes of fluid and for calibrating medical devices, such as intravenous infusion pumps, includes a plurality of valves and associated conduits which direct fluid from the device being tested to a transparent vertical column. A plurality of sensors, each including a light emitting diode and a light detector, are arranged along the axial length of the column at a predetermined spacing between adjacent sensors. Fluid from the device being tested is directed through the flow tester by the valves and associated conduits into the column where it rises. The meniscus of the fluid rising in the column is detected by the sensors. The sensors provide signals to a microcontroller which calculates the time that it takes for the fluid to pass each sensor. Knowing this timing and the volume of the column, the flow rate of the fluid may be calculated by the microcontroller.

23 Claims, 36 Drawing Sheets

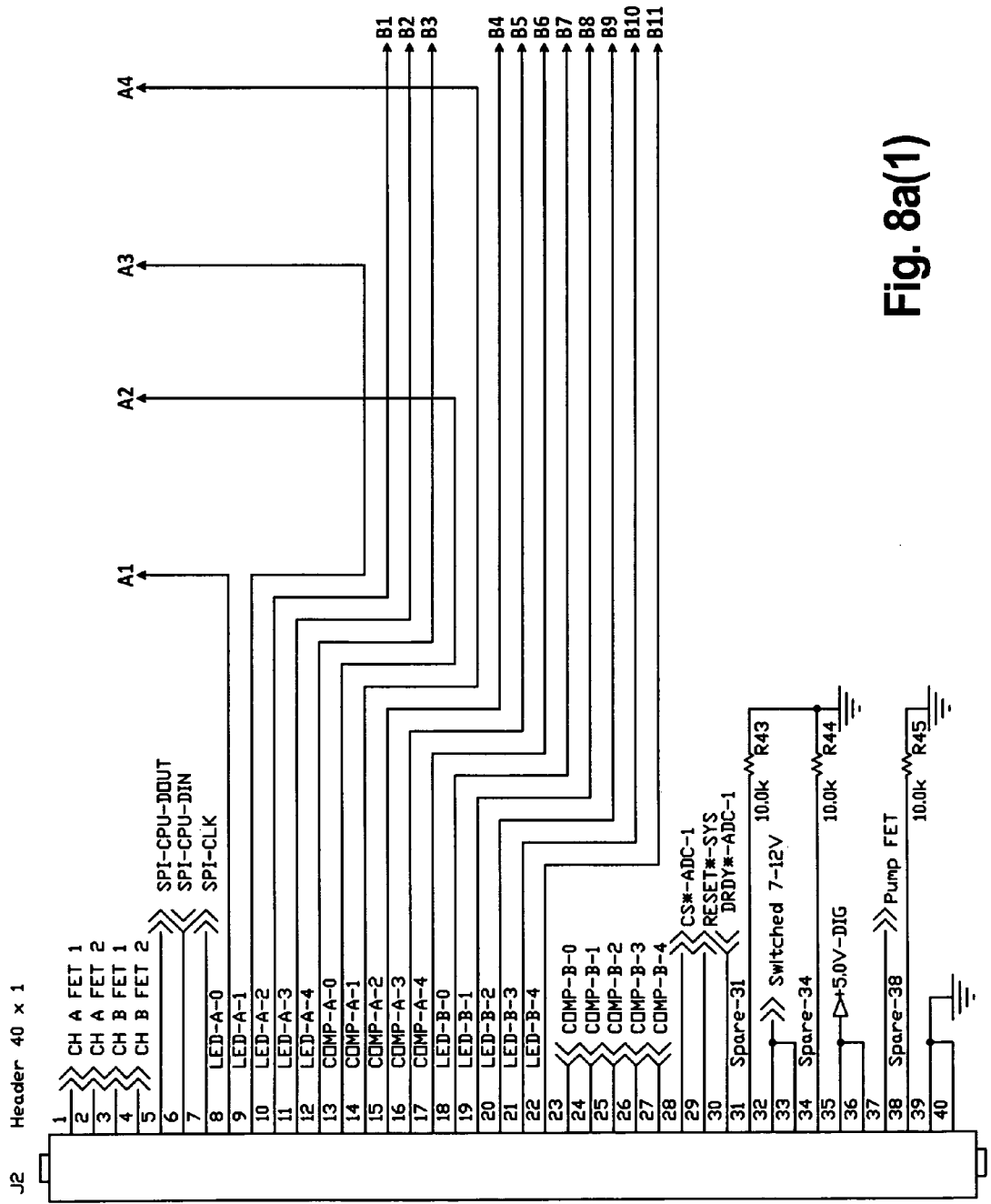
Fig. 8a(1)

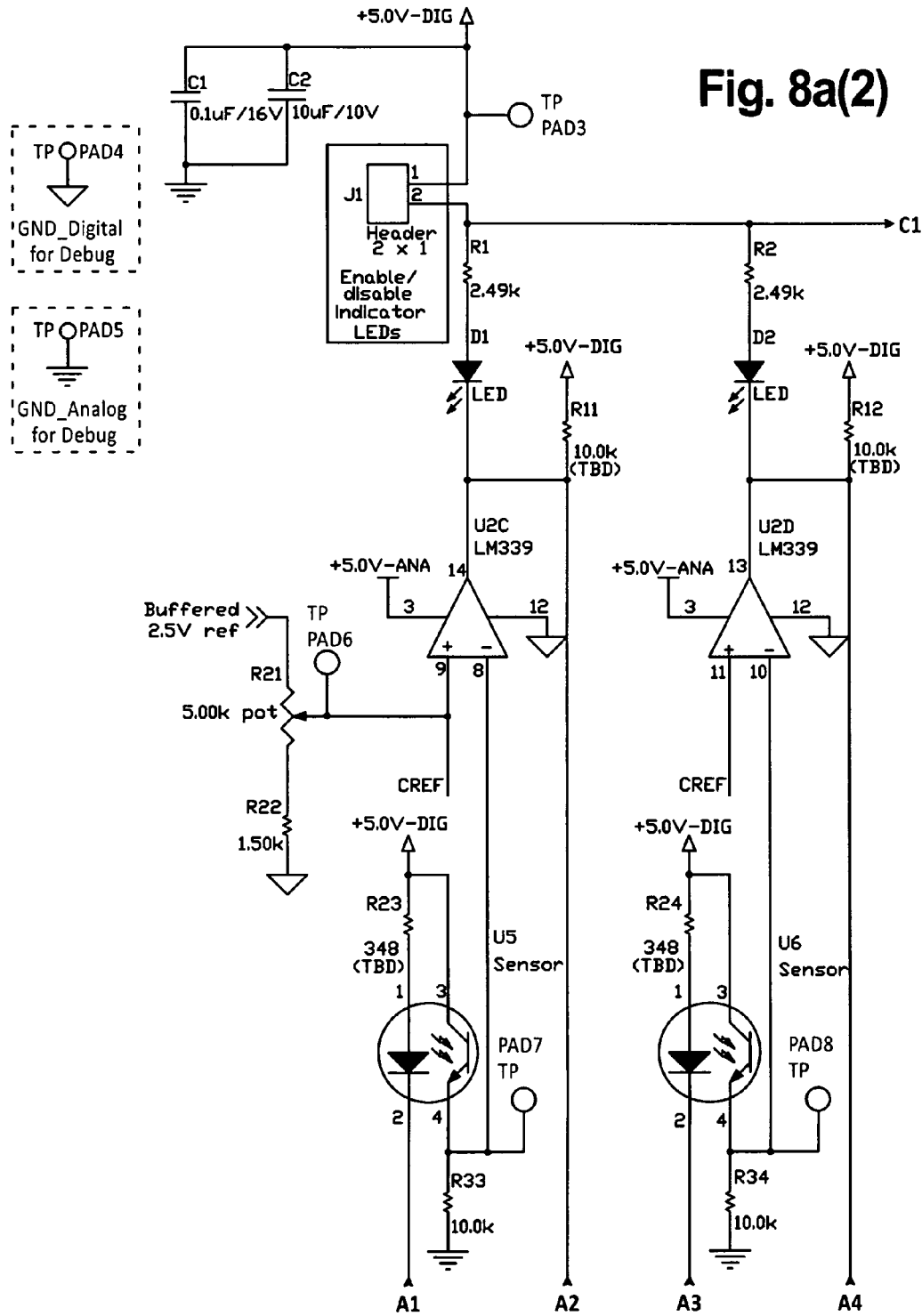
Fig. 8a(2)

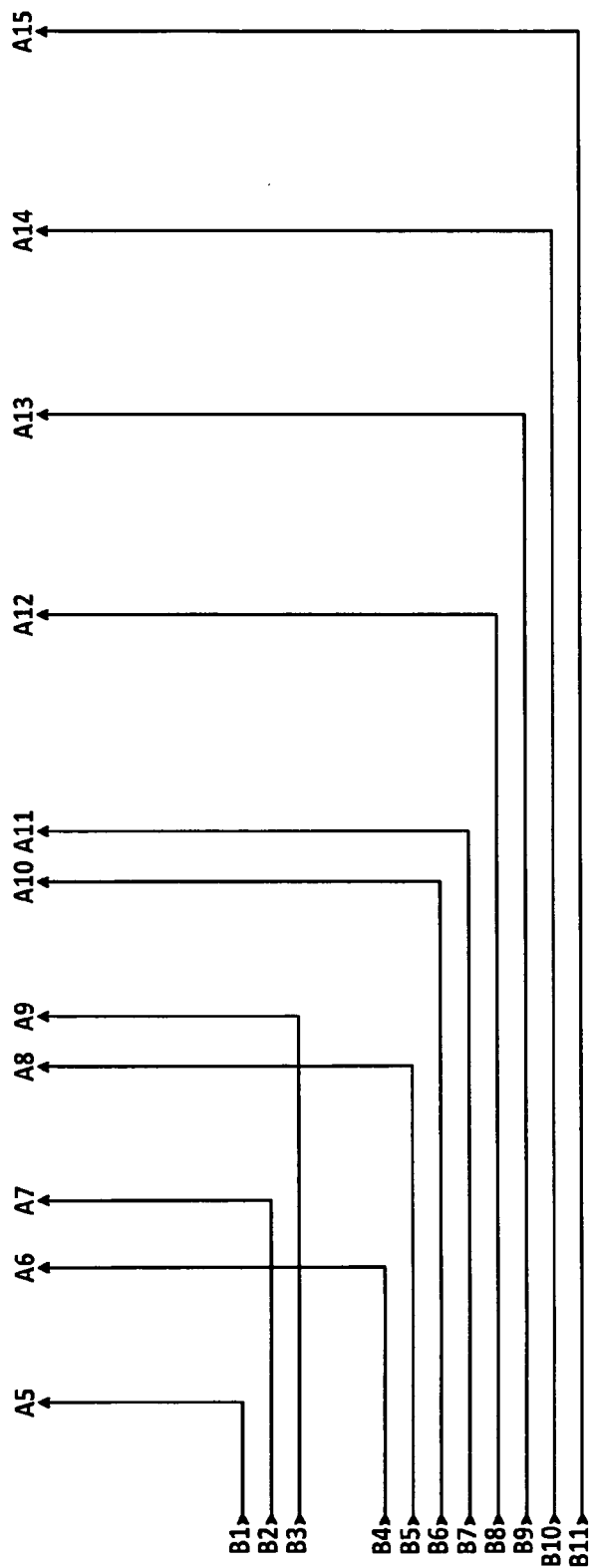

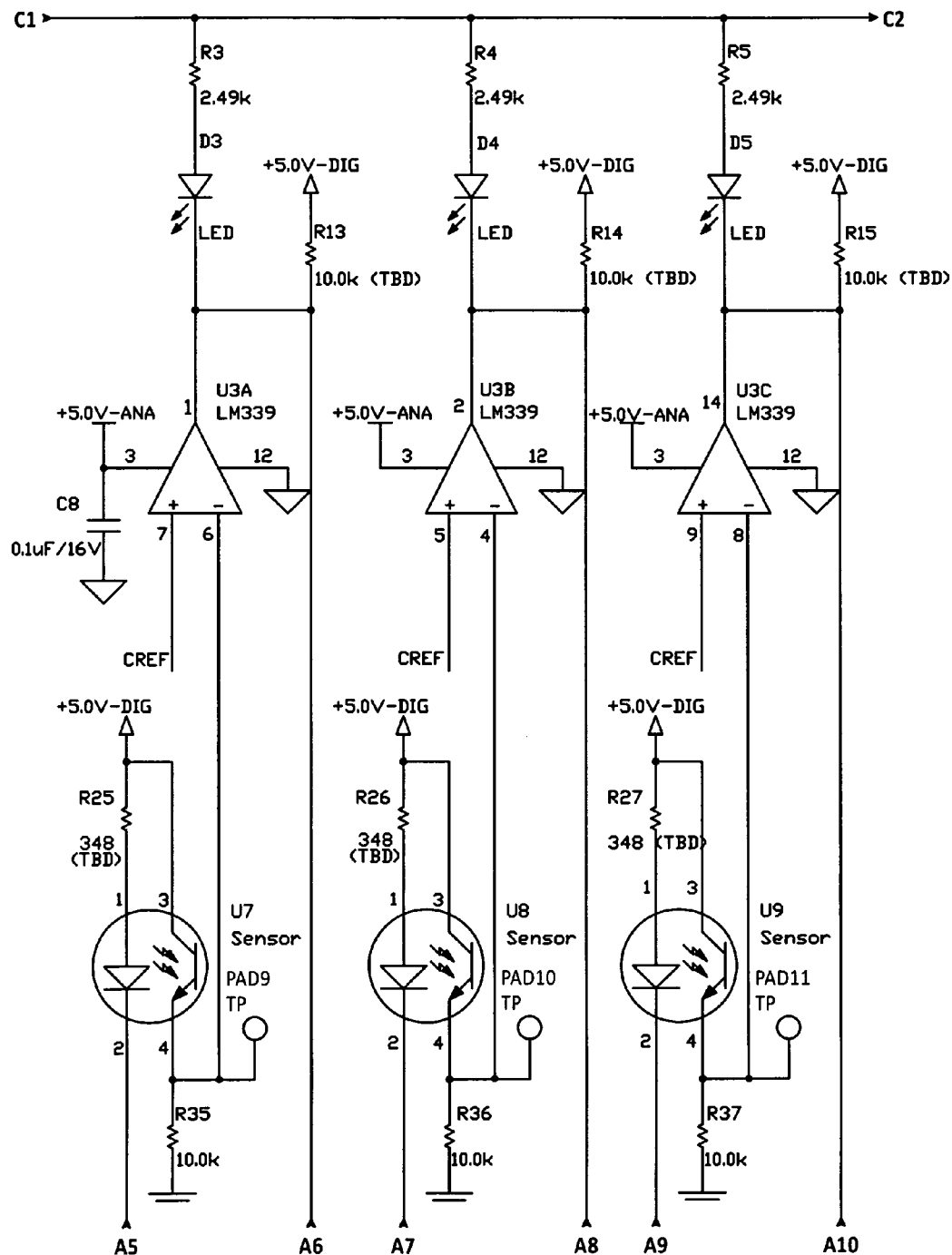
Fig. 8a(4)

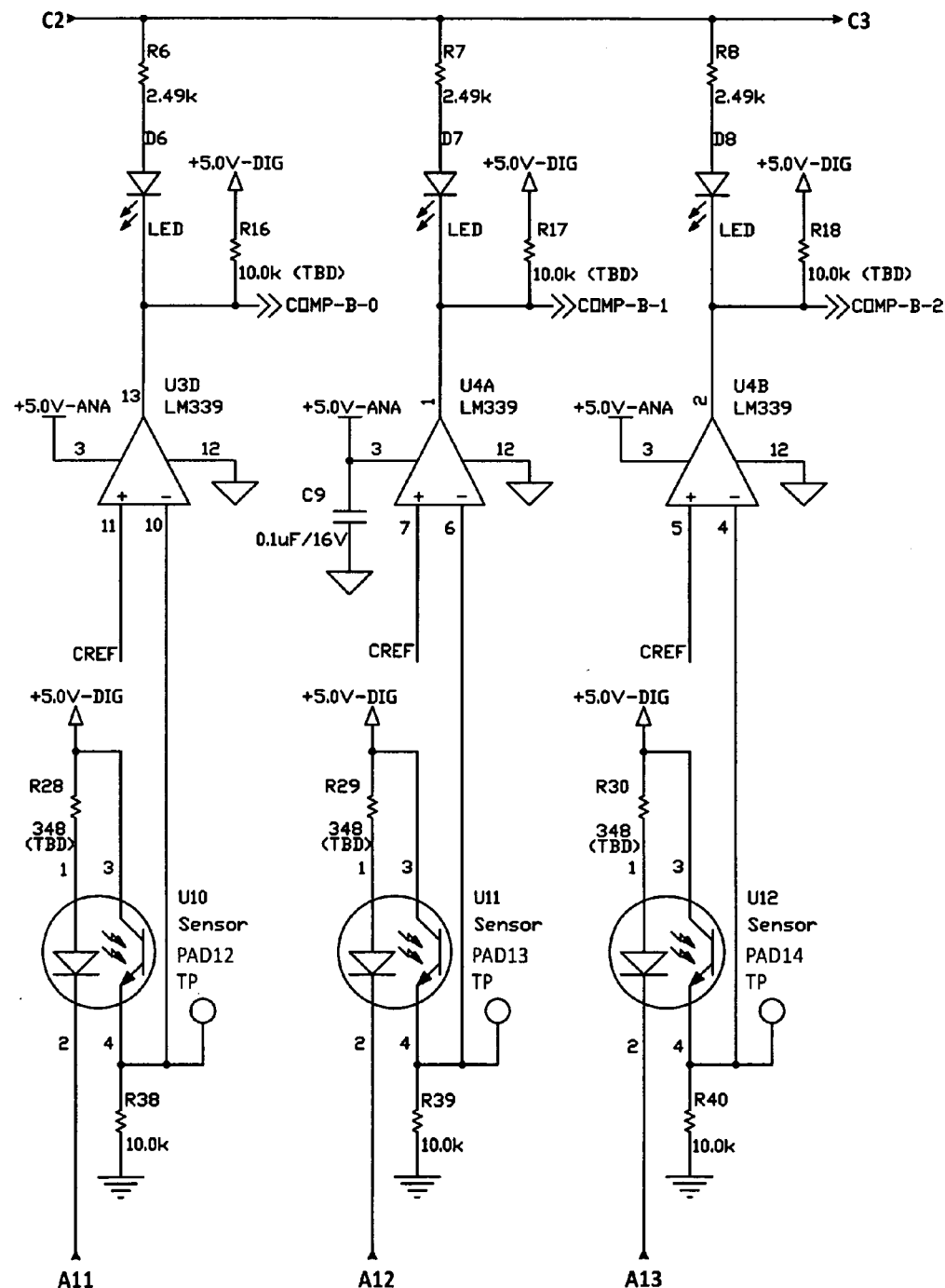
Fig. 8a(5)

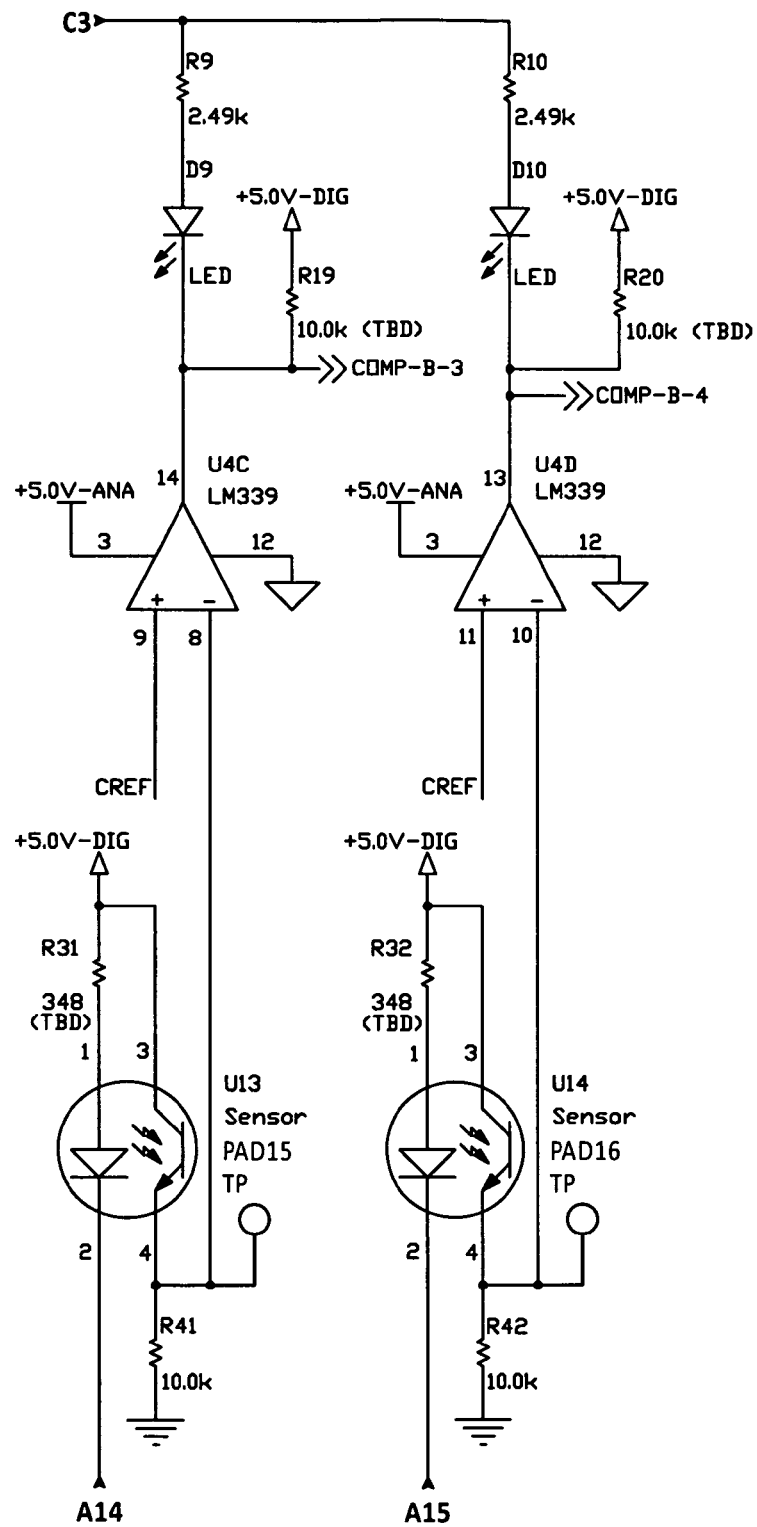
Fig. 8a(6)

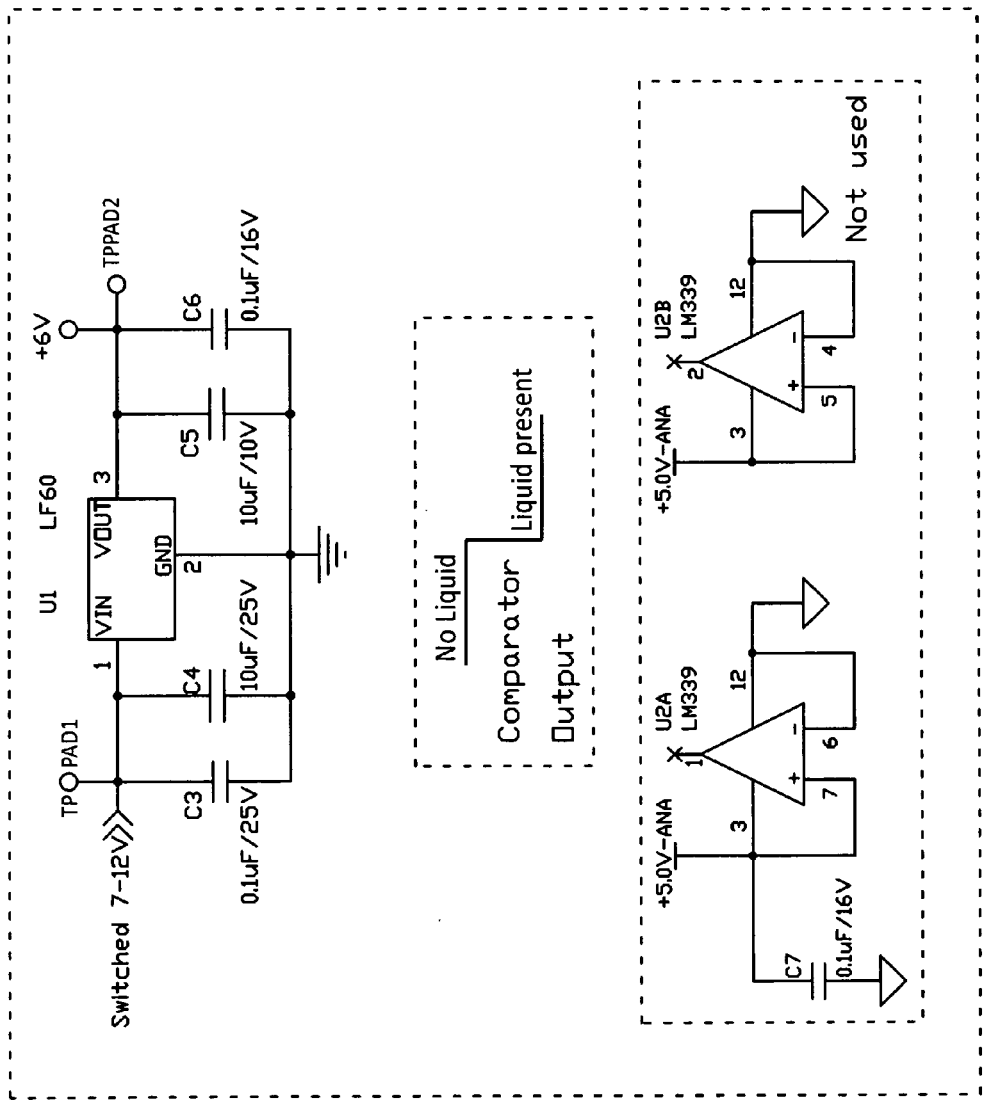
Fig. 8a(7)

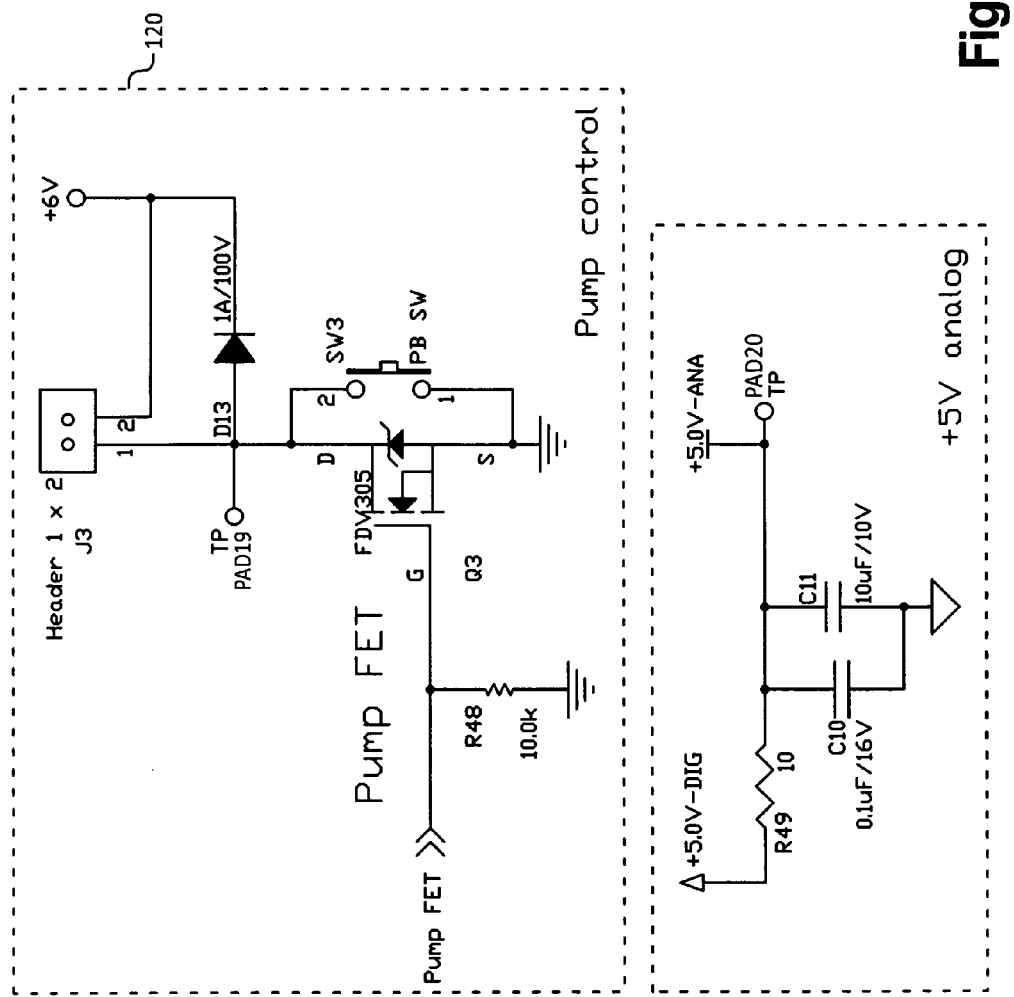
Fig. 8b(1)

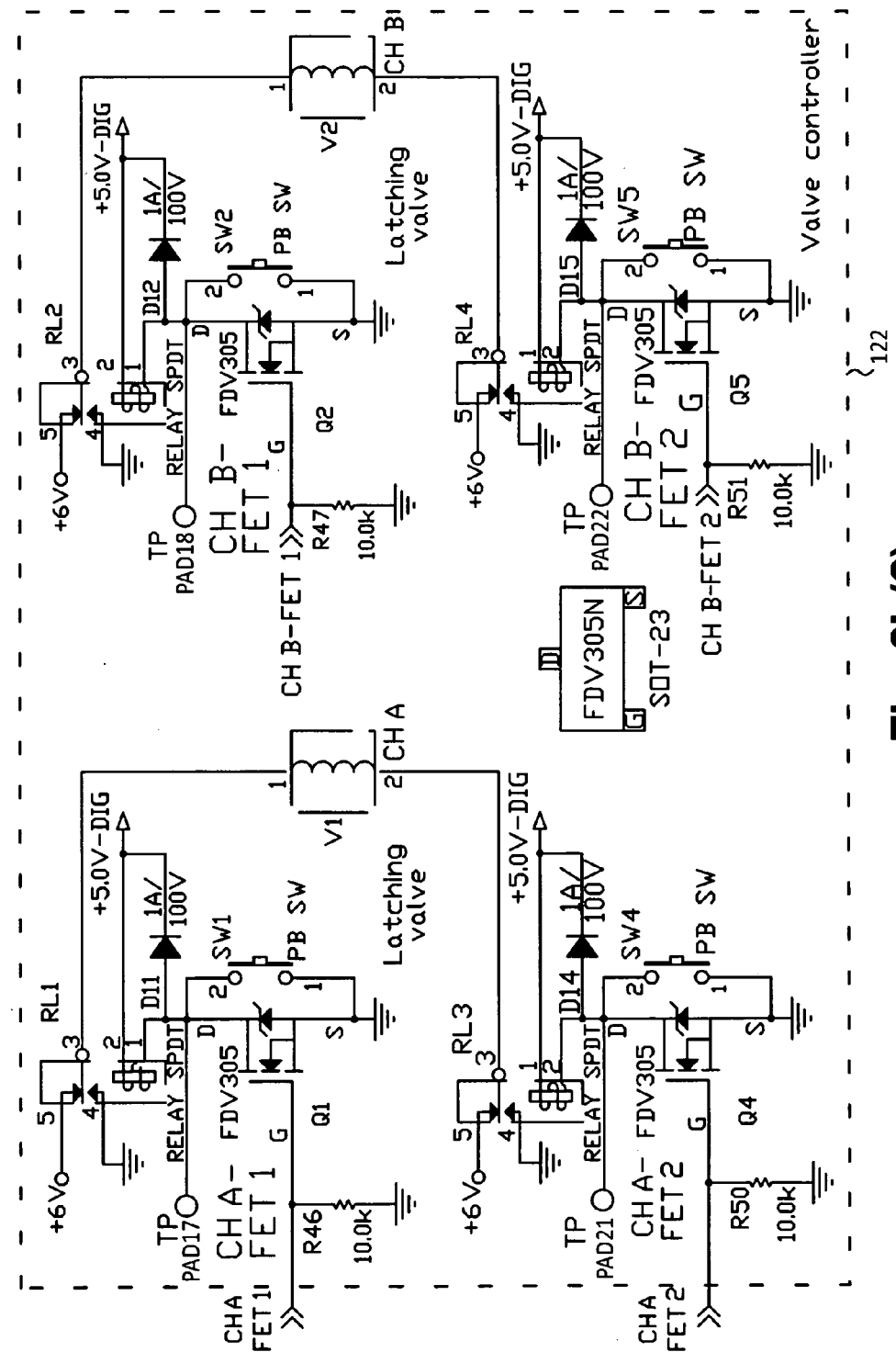
Fig. 8b(2)

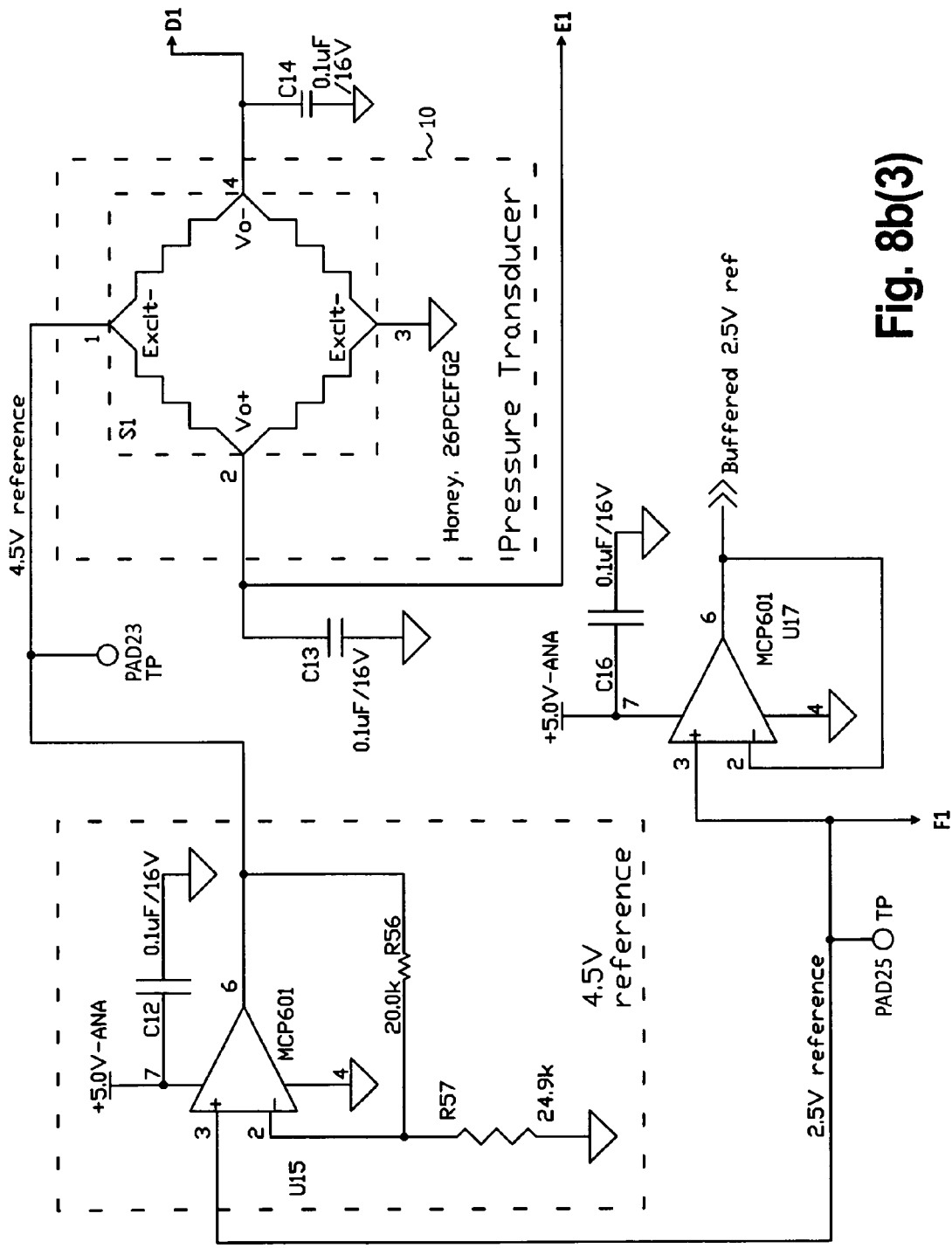
Fig. 8b(3)

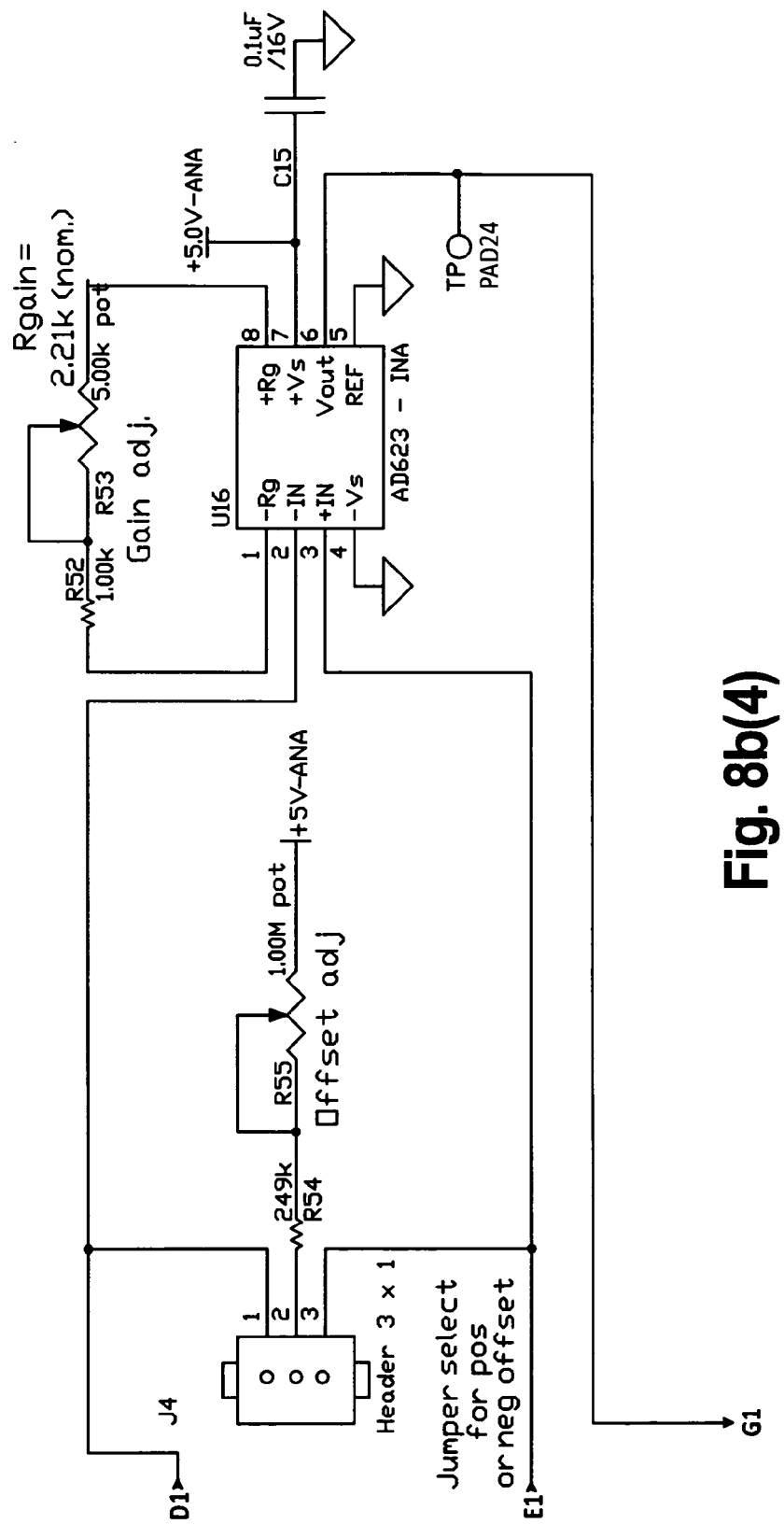
Fig. 8b(4)

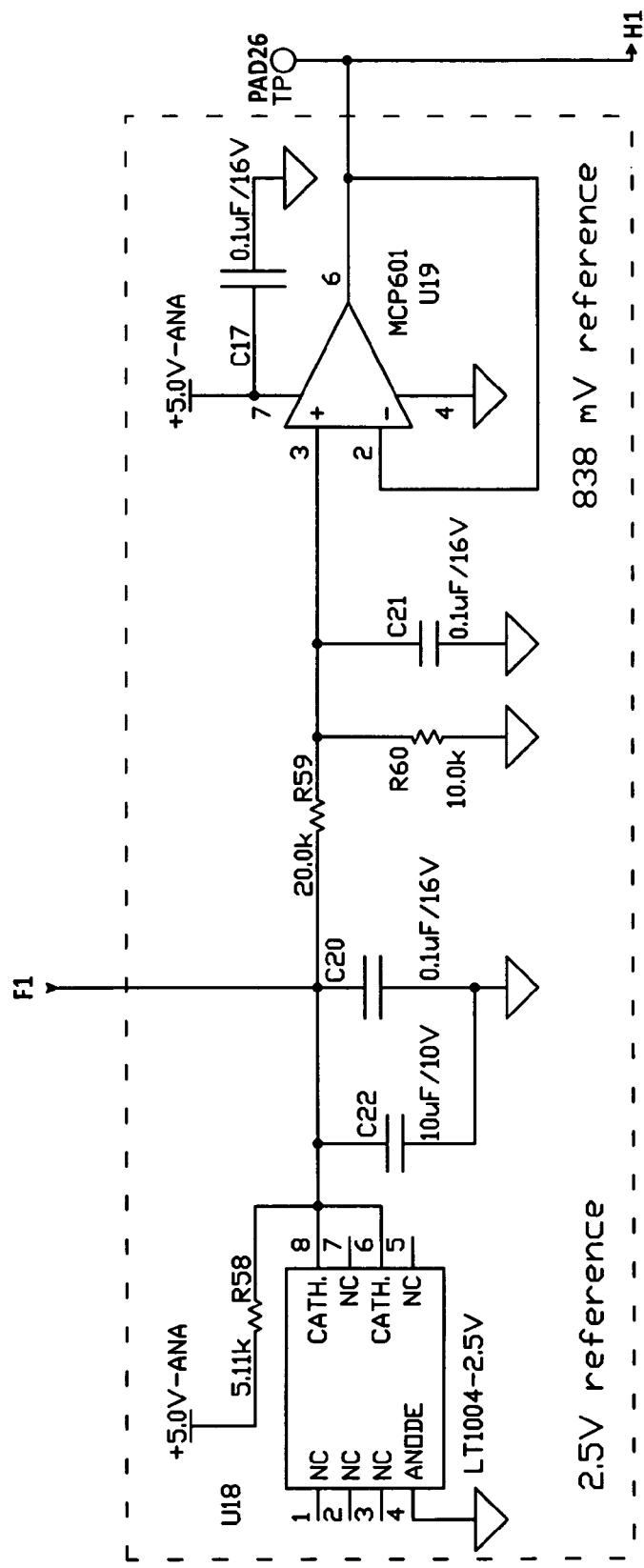
Fig. 8b(5)

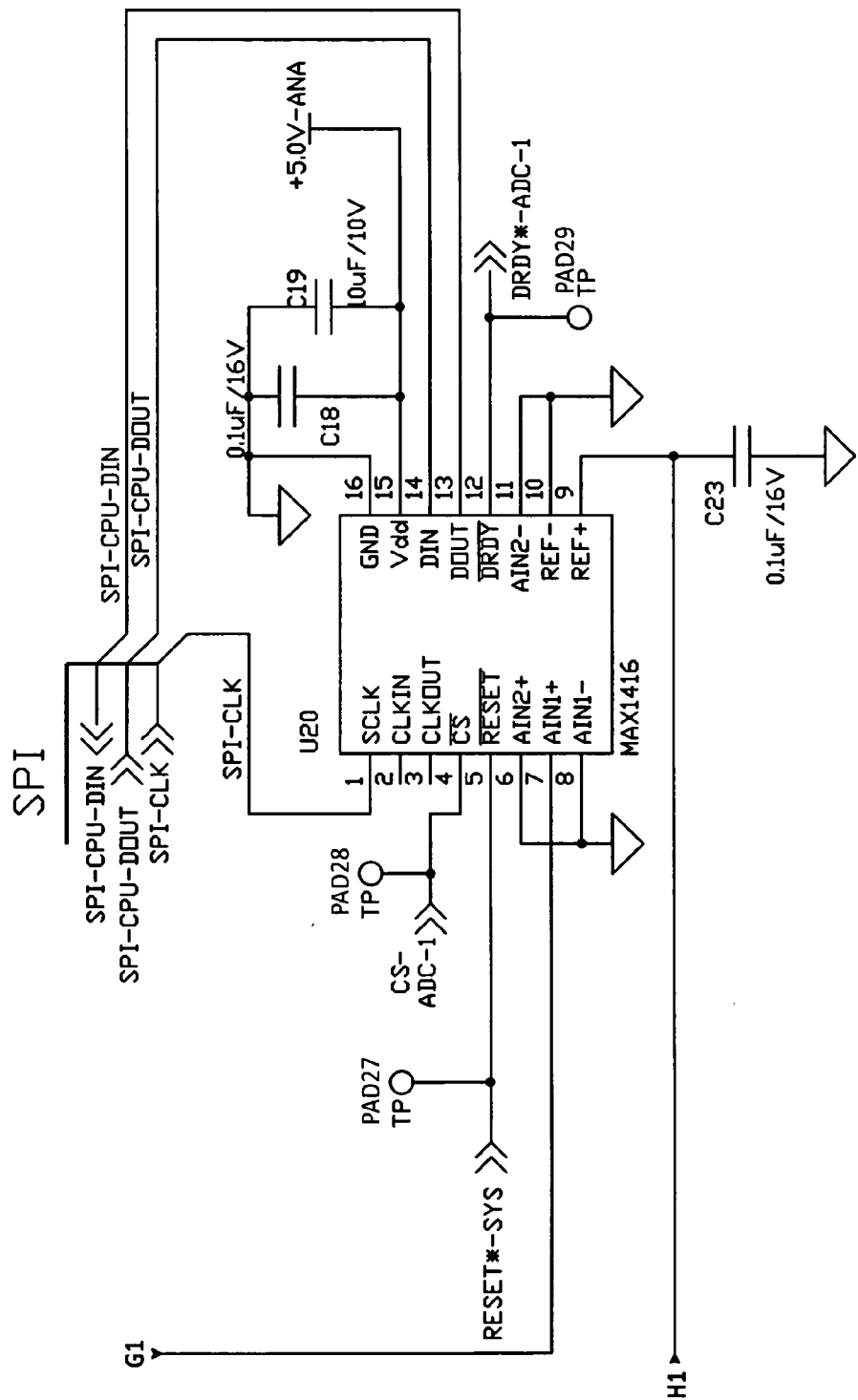
Fig. 8b(6)

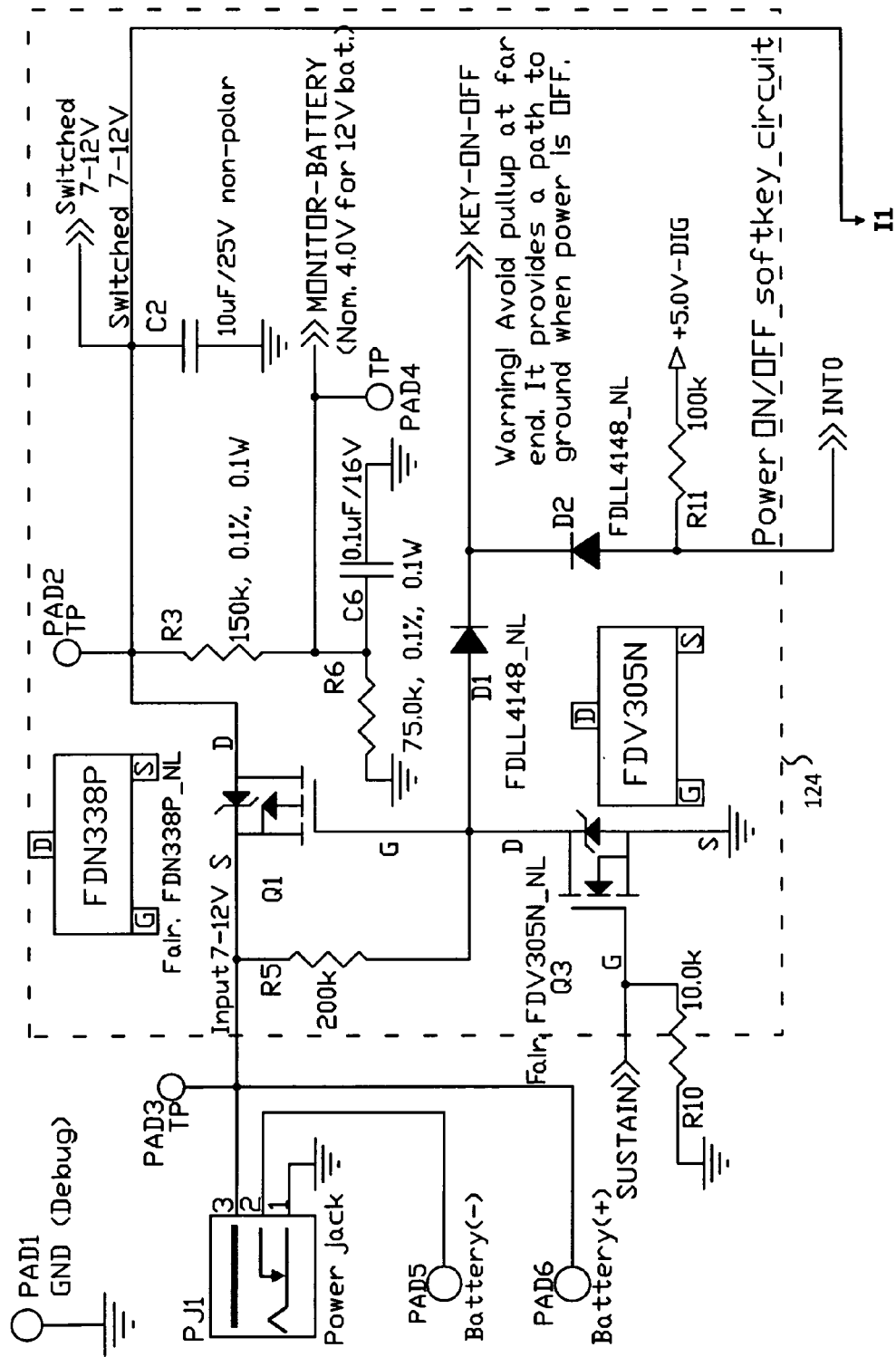
Fig. 9a(1)

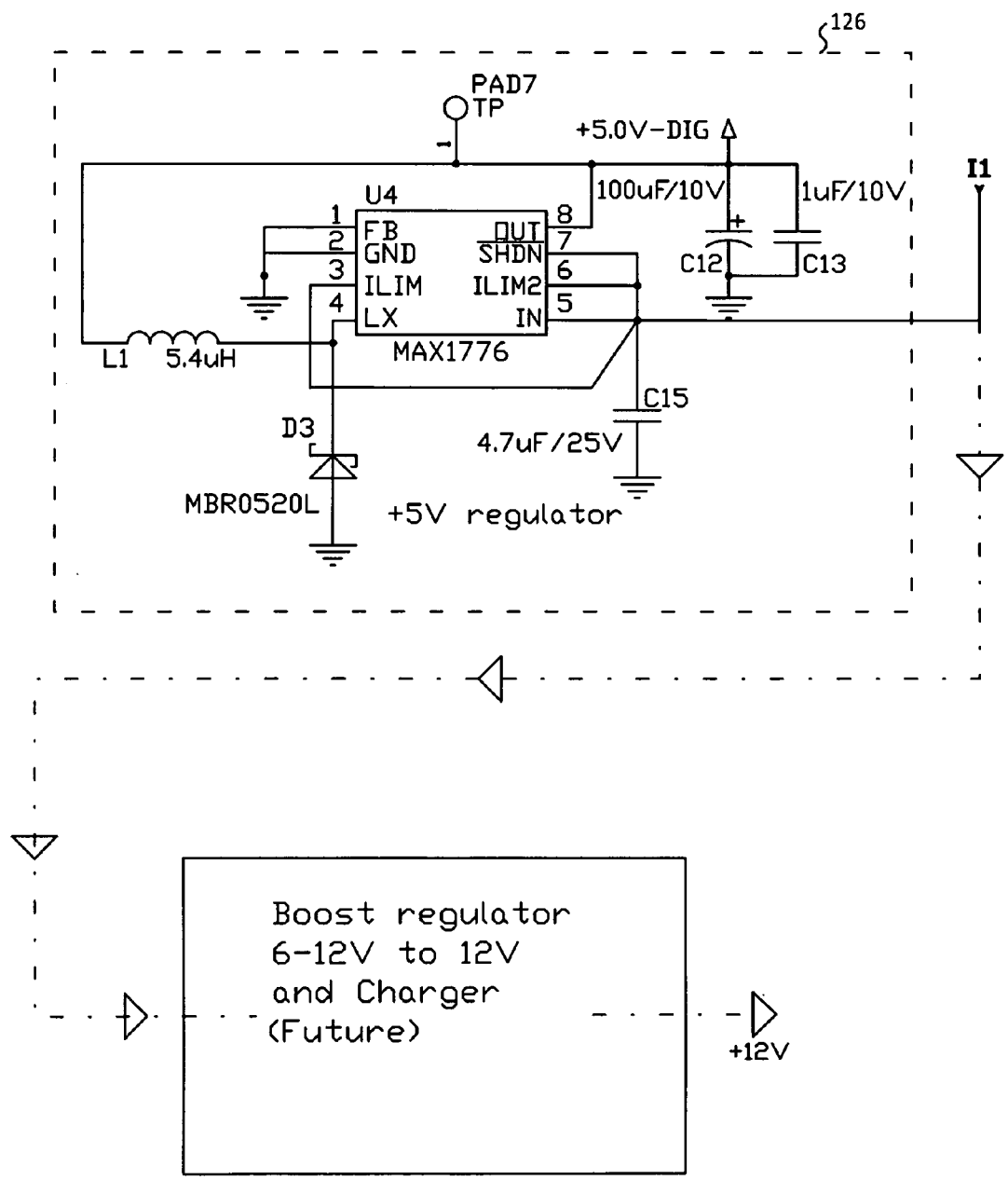
Fig. 9a(2)

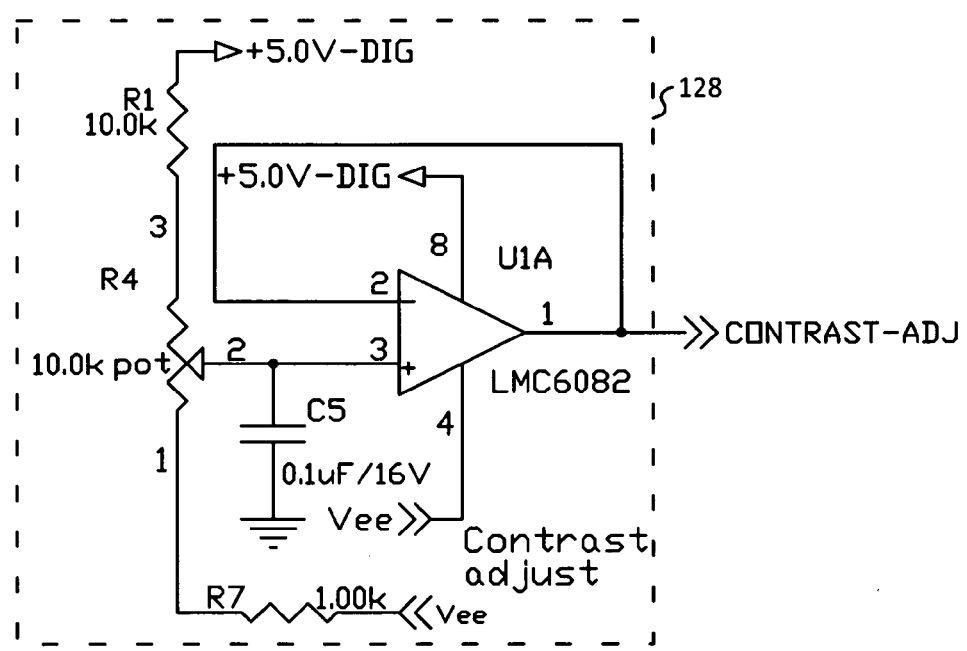
Fig. 9a(3)

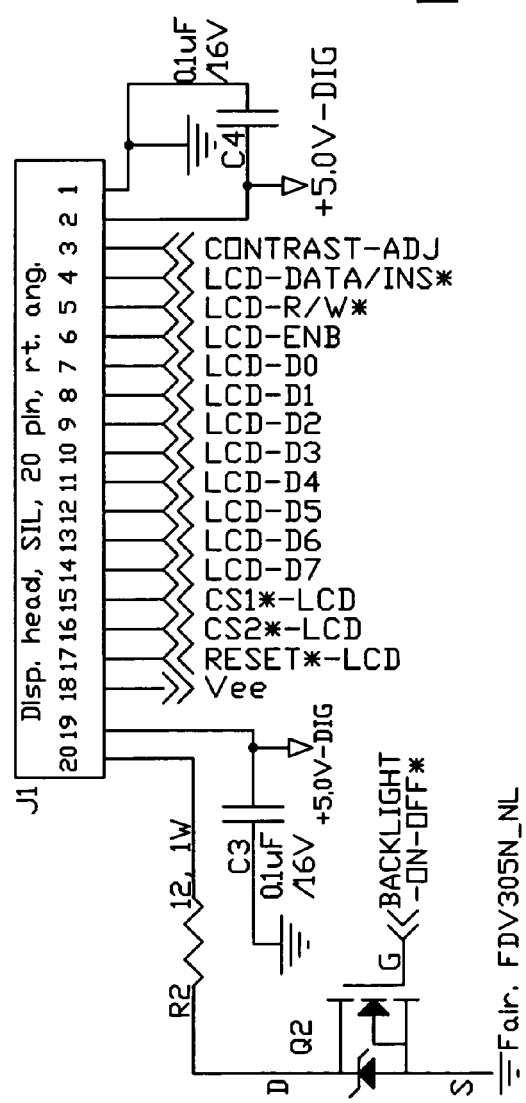
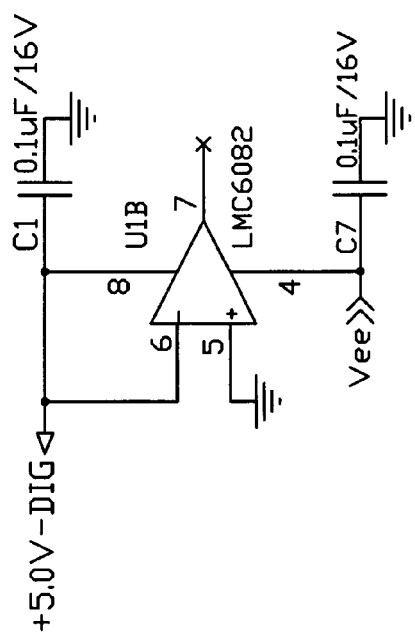
Fig. 9a(4)
Fig. 9a(5)

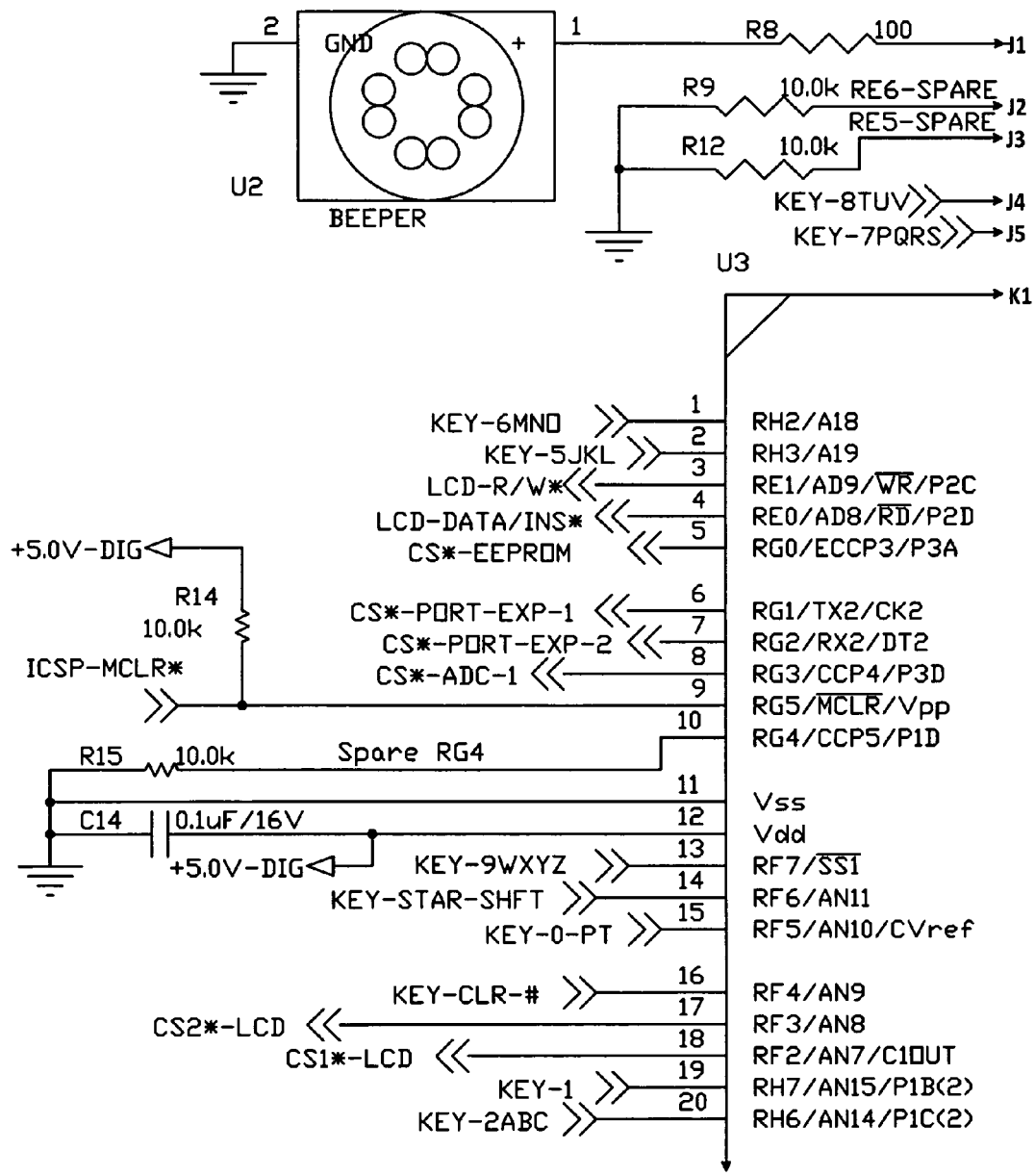
Fig. 9a(6)

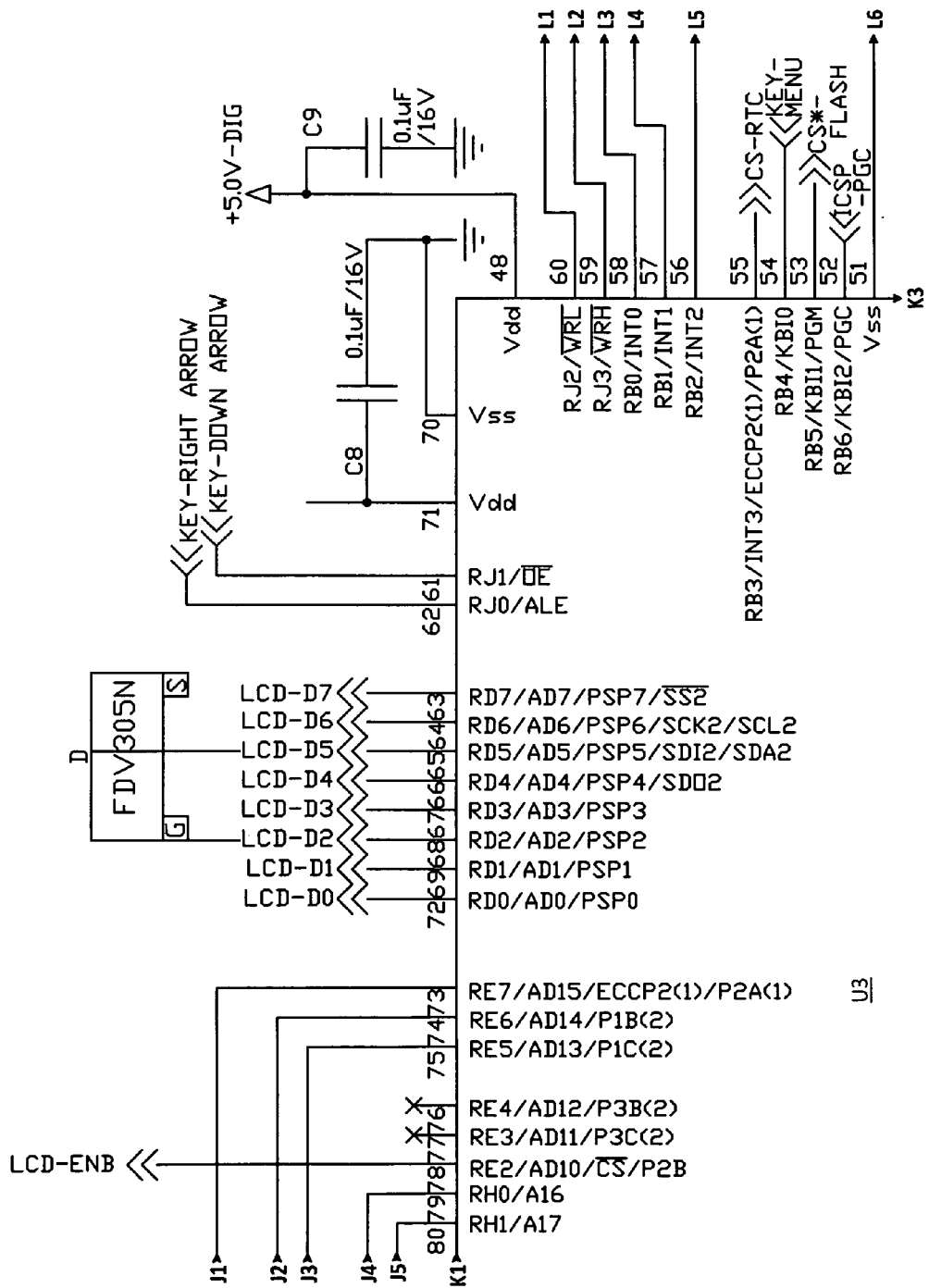
Fig. 9a(7)

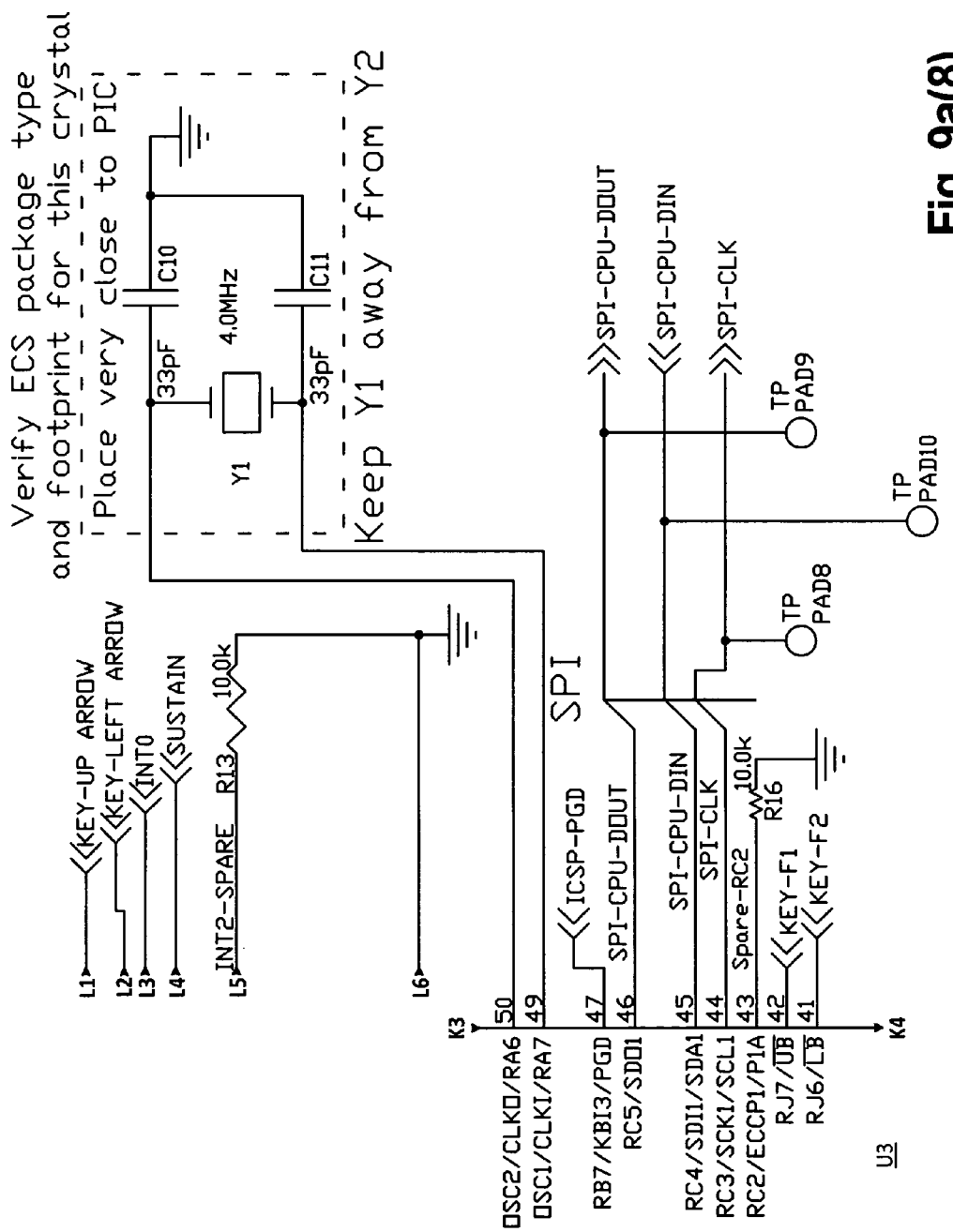
Fig. 9a(8)

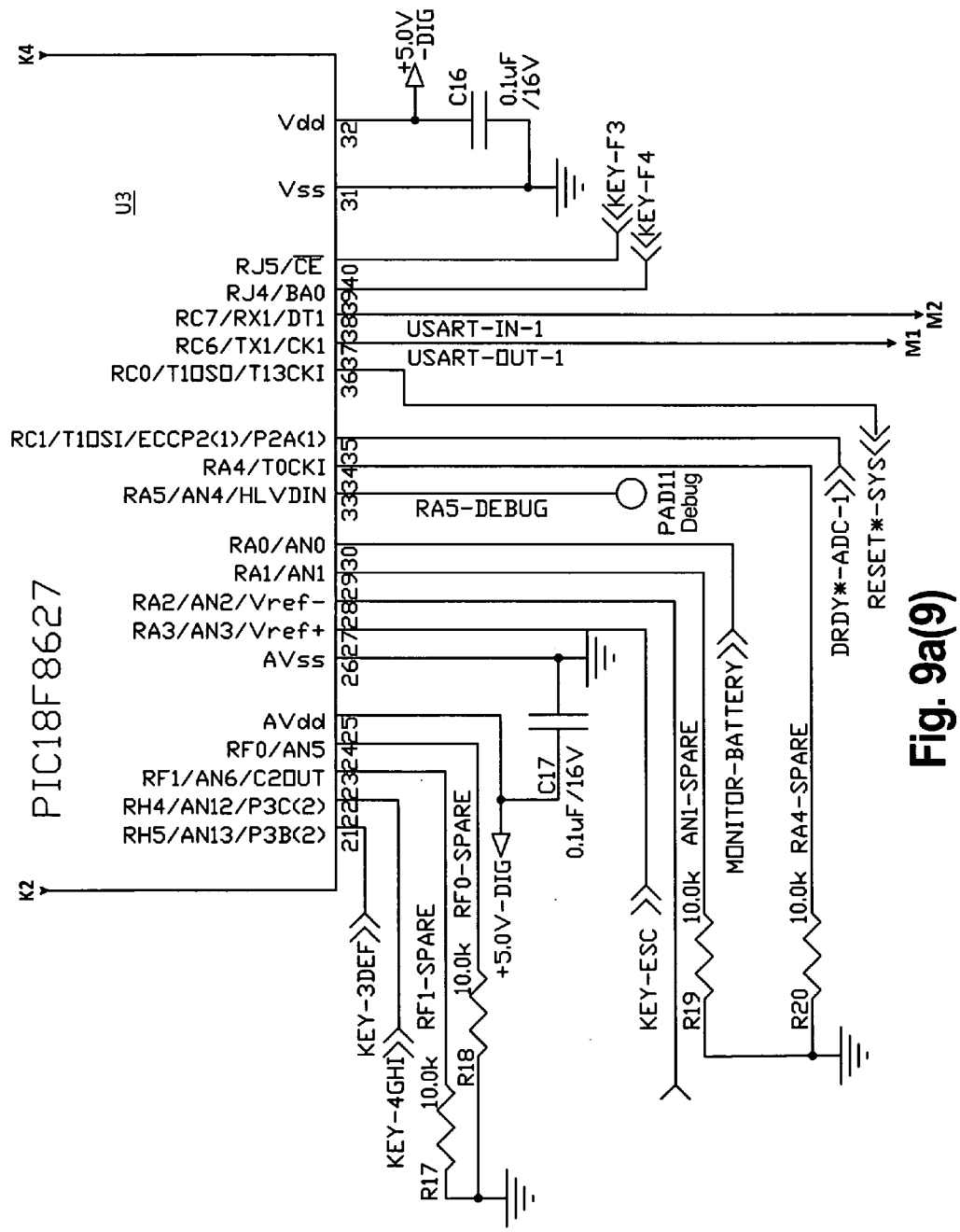
Fig. 9a(9)

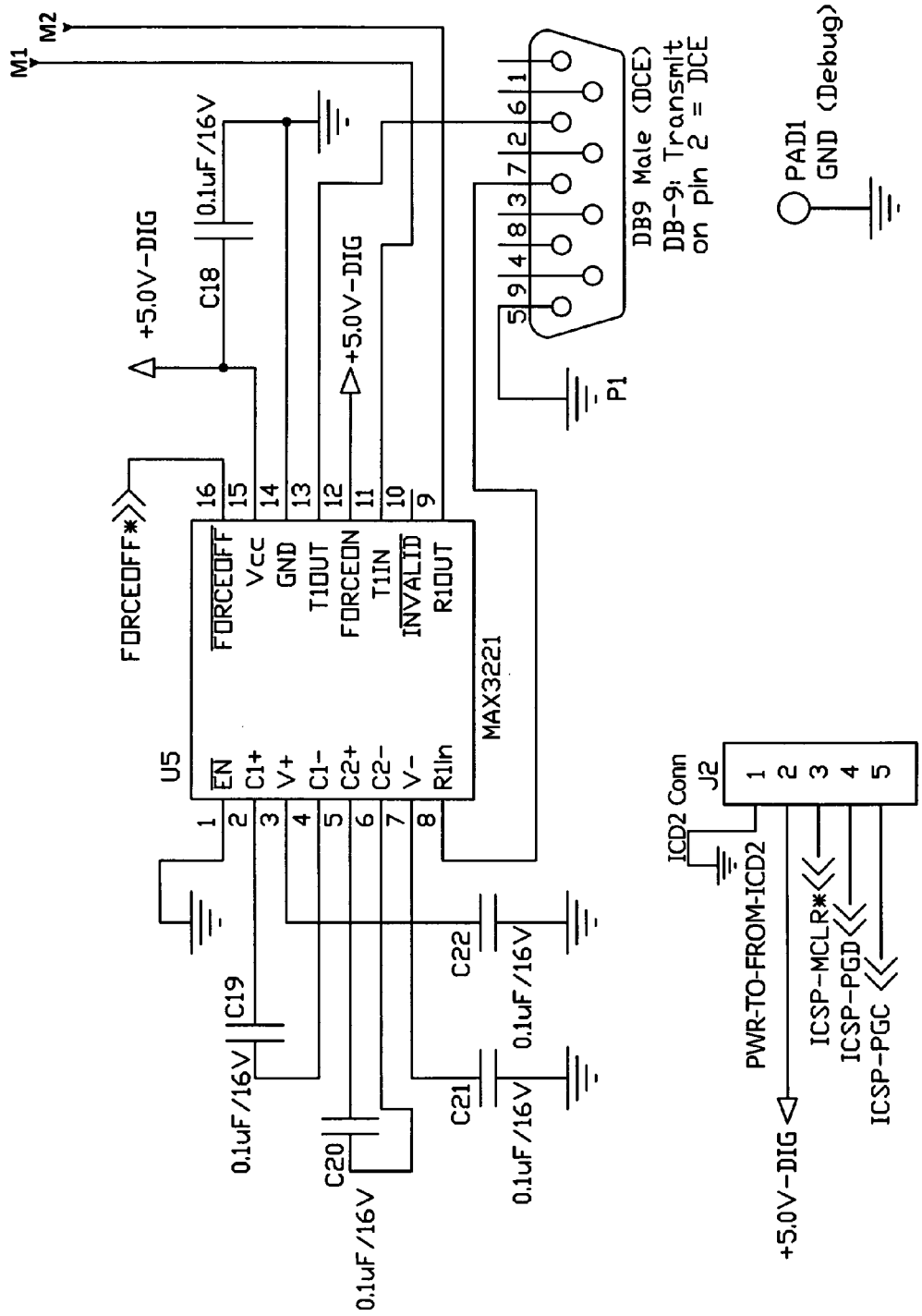
Fig. 9a(10)

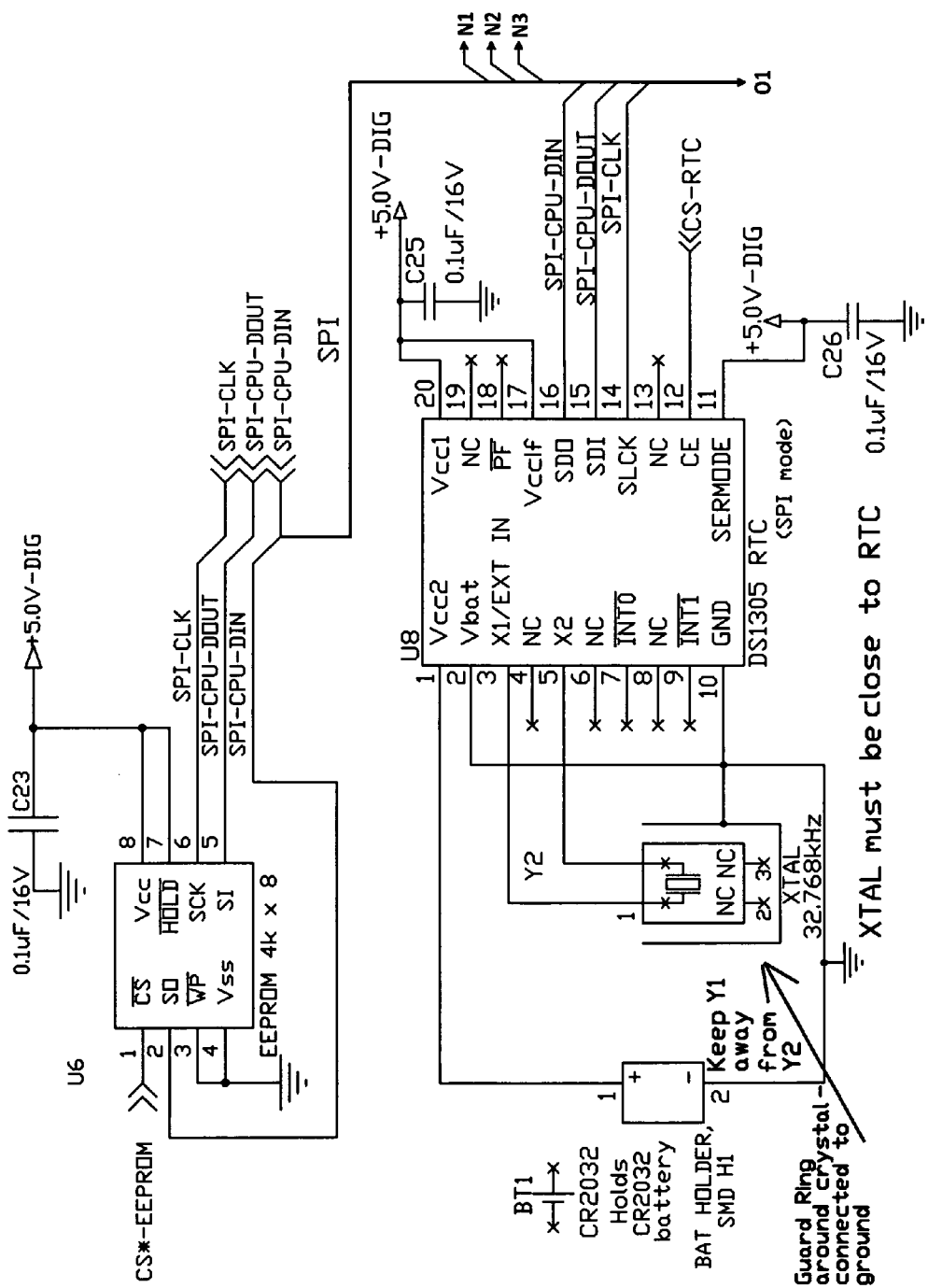
Fig. 9b(1)

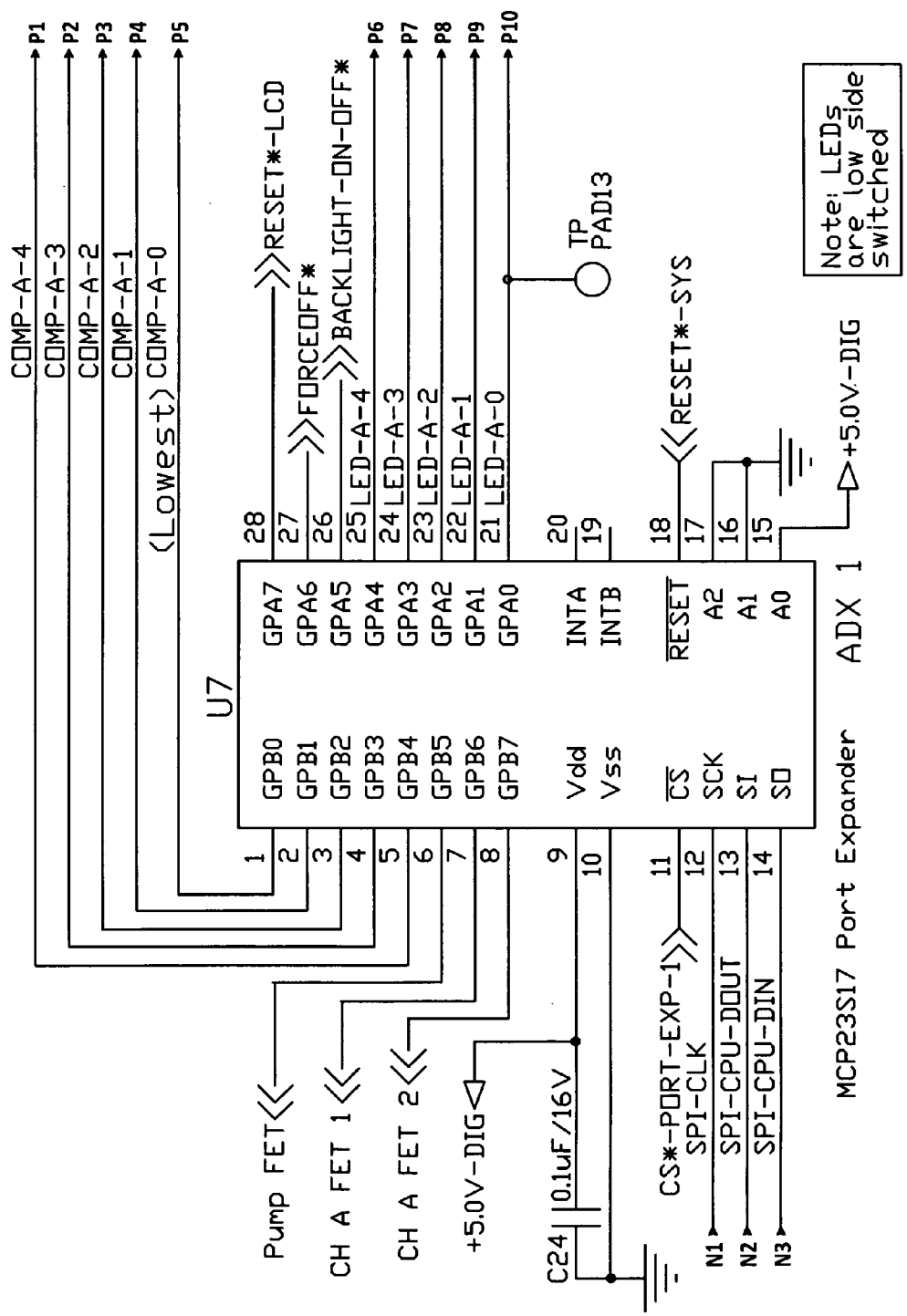
Fig. 9b(2)

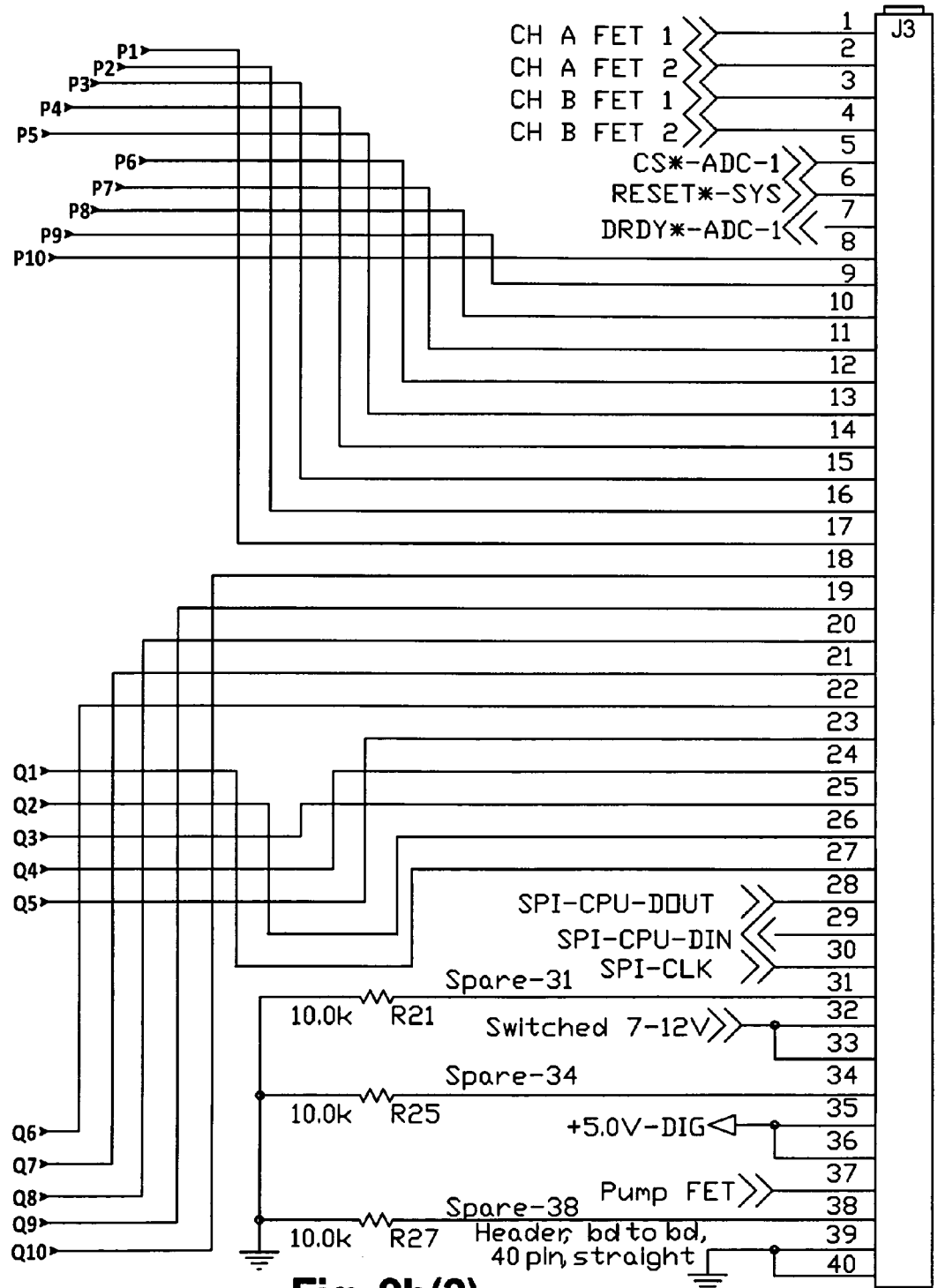
Fig. 9b(3)

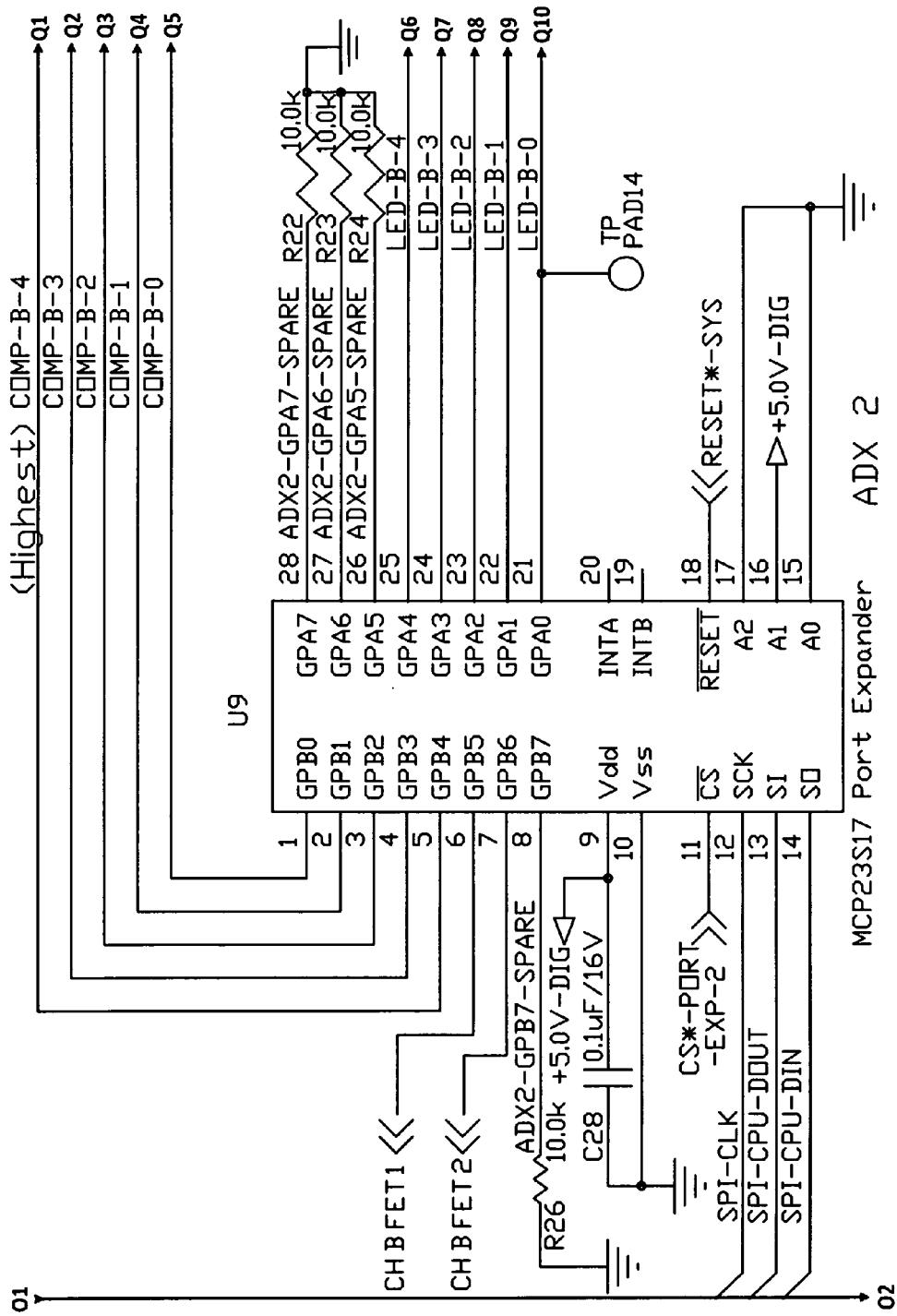
Fig. 9b(4)

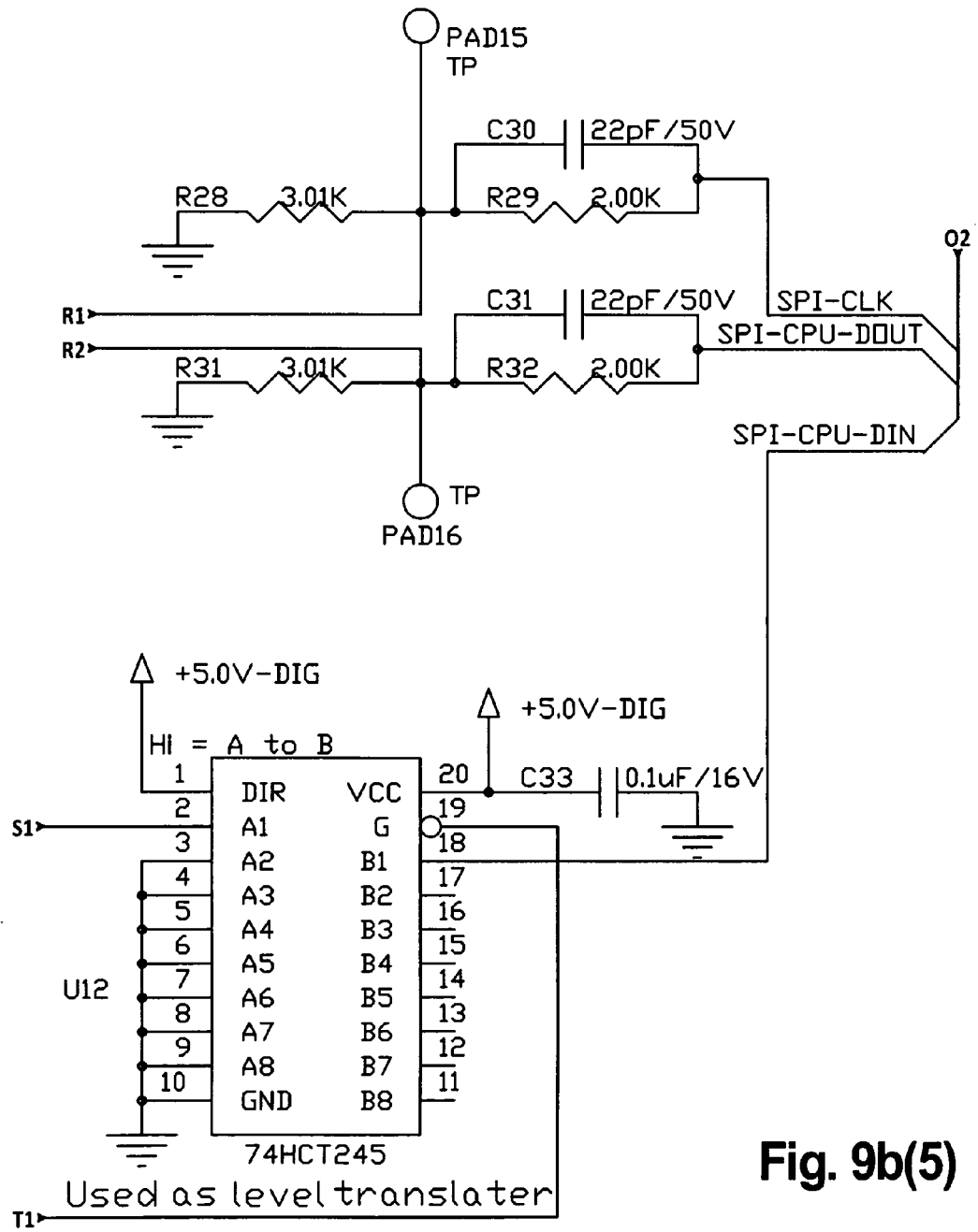
Fig. 9b(5)

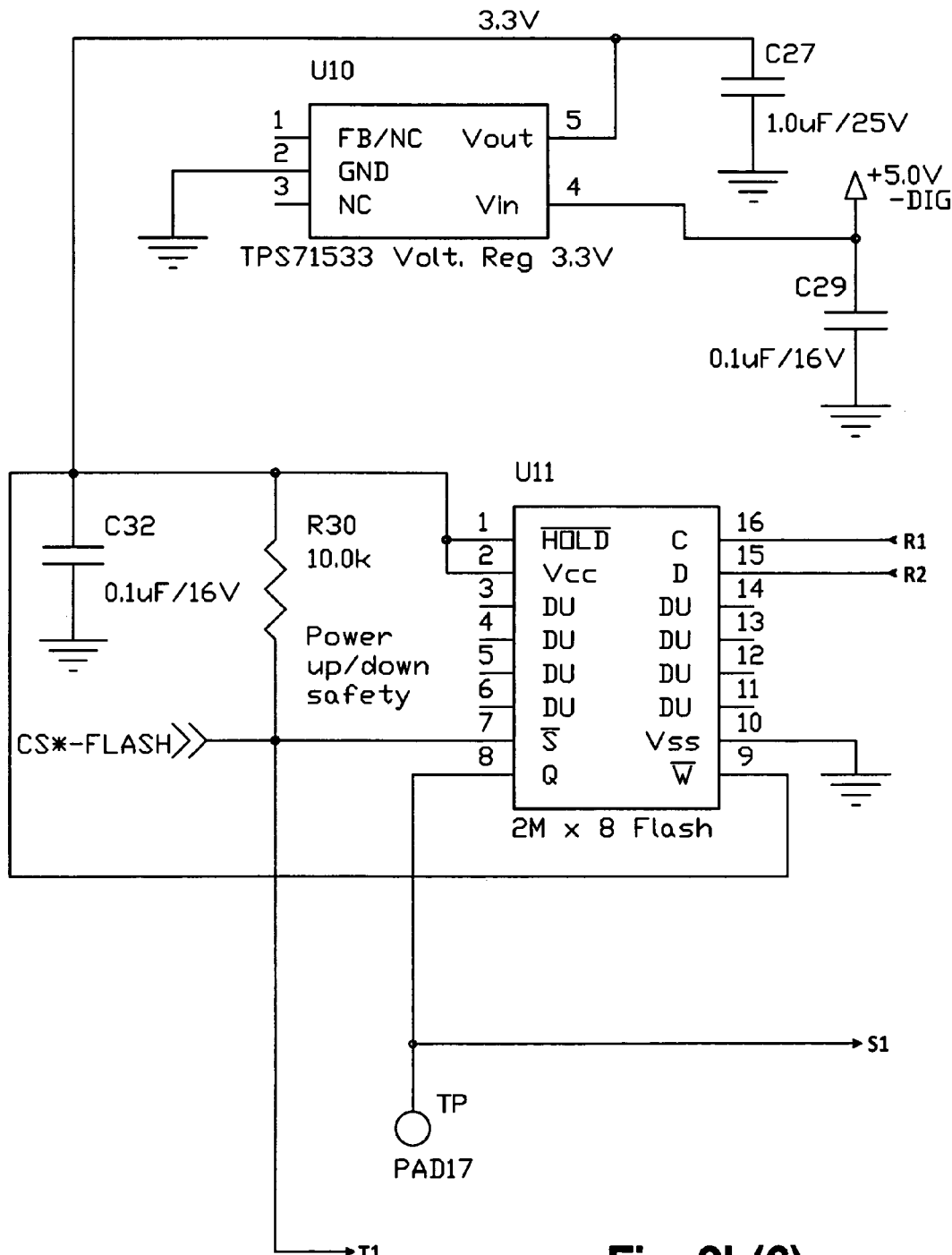
Fig. 9b(6)

MULTI-FUNCTION FLOW TESTER

CROSS-REFERENCE TO RELATED APPLICATIONS

This application is related to U.S. Provisional Application Ser. No. 60/934,565, filed on Jun. 14, 2007, entitled "Multi-Function Flow Tester", the disclosure of which is incorporated herein by reference and on which priority is hereby claimed.

BACKGROUND OF THE INVENTION

1. Field of the Invention

This invention relates to a precision testing instrument capable of performing multiple tests, and more specifically, a precision testing instrument capable of performing fluid measurements.

2. Description of the Prior Art

Various fluid delivery systems, specifically fluid delivery systems designed to administer precise amounts of fluid and/or medication to individuals, require constant calibrations and accuracy tests to ensure safety and functionality. Particularly, intravenous (IV) infusion devices, also known as IV pumps, require calibration at set time periods to verify that the device is functioning properly.

More specifically, medical infusion pumps are designed to deliver over time preset volumes of medicine or intravenous fluids to patients. In most cases, the flow can be preset anywhere from about 1 milliliter per hour to about 1000 milliliters per hour. It is extremely important to check the performance, such as flow rate, delivered volume and occlusion pressure, of these infusion pumps. Although several calibration instruments are currently available, many of them are inaccurate and time consuming to use to make measurements at such low flow rates.

As mentioned above, various tests are performed on these devices, in particular, pressure tests, volume delivery tests, and flow rate evaluation. Conventionally, these tests are performed by trained technicians. This often requires the device to be taken out of service and either shipped to a testing site or moved to a laboratory. The testing process can incorporate various devices including computers and inline flow meters. Conventional methods of performing these tests include using differential pressure readings or occlusion sensing. Both of these methods are time consuming as it is difficult to get an accurate calibration based upon the small rates and the testing devices' design. For example, the Infutest 2000™ manufactured by Datrend Systems Inc. (Canada) injects a bubble into the flow of fluid and tracks the movement of the bubble. The IDA4 Plus Multi-Channel Infusion Device manufactured by Fluke Corporation is a differential pressure flow meter. Both of these devices are relatively slow and require relatively large volumes of fluid for flow measurement.

OBJECTS AND SUMMARY OF THE INVENTION

It is an object of the present invention to provide a multi-function flow tester which has the capability of performing precise fluid measurements including flow rate, volume and pressure, on a specific unit under test.

It is another object of the present invention to provide a flow tester for measuring small volumes of fluid flowing from a device being tested.

It is yet another object of the present invention to provide a flow tester which provides instantaneous measurements of pulsatile and linear flows of fluid, such as from a medical infusion pump.

It is still another object of the present invention to provide a flow tester which has the capability of performing accurate mean flow rate measurements.

It is yet another object of the present invention to provide a multi-function flow tester which has the capability of automatically performing occlusion pressure measurements with no need for manual intervention.

It is a further object of the present invention to provide a multi-function flow tester which has the capability of storing long-term flow test measurements for trend analysis and the like.

It is yet a further object of the present invention to provide a multi-function flow tester which is compact and lightweight.

It is a further object of the present invention to provide a flow tester which includes a relatively large and easily viewable graphics display, which displays the measured flow rate as a bar graph.

It is yet another object of the present invention to provide a flow tester which is easy to use and is menu driven.

It is still another object of the present invention to provide a flow tester which provides a flow status indication.

In accordance with one form of the present invention, a fluid flow tester for measuring minute volumes of fluid and for calibrating medical devices, such as intravenous infusion pumps, includes a plurality of valves and associated conduits which direct fluid from the device being tested to a transparent vertical column. A plurality of sensors, each including a light emitting diode and a light detector, are arranged along the axial length of the column at a predetermined spacing between adjacent sensors. Fluid from the device being tested is directed through the flow tester by the valve and associate conduits into the column where it rises. The meniscus of the fluid rising in the column is detected by the sensors. The sensors provide signals to a microcontroller which calculates the time that it takes for the fluid to pass each sensor. Knowing this timing and the volume of the column, the flow rate of the fluid may be calculated by the microcontroller.

The present invention, in one form, is a medical infusion pump analyzer which is designed to measure, with precision, the flow rate, volume delivered, and occlusion pressure of infusion pumps. Unlike other measurement devices currently available, the infusion pump analyzer of the present invention instantly and accurately measures flow rate, even at flow rates as low as about 10 milliliters per hour. It is ideal for all kinds of infusion pumps, linear as well as pulsed.

The infusion pump analyzer of the present invention uses optical fluid sensors preferably spaced precisely half an inch apart from each other and mounted on a calibrated tubular column. Initially, the incoming flow of fluid is diverted out a drain port by a first control valve V2. If there is any fluid in the column, it is evacuation preferably by an air pump and a second control valve V3. A third control valve V1, and the valve V2, are set to a state to drain the fluid from the calibrated tubular column. Once the column is empty, the fluid is introduced into the column by setting the state of control valve V1 and V2. When the fluid is introduced into the column, the level of the fluid rises in the column due to the flow. The fluid passes by the optical fluid sensors, whose output signals are monitored continually by a microcontroller. As the fluid rises through the tube, the time duration of the fluid to pass between two adjacent sensors is precisely measured, and the flow is instantly computed by the microcontroller and shown on a display. Each time the fluid passes a sensor, the microcontroller measures the time interval between sensors, and updates the flow rate.

As the fluid reaches the top sensor on the column, the microcontroller computes the average flow and the volume delivered. Simultaneously, the flow is diverted to the output drain, and the fluid in the column is evacuated, and the process is repeated.

The occlusion pressure measurement is accomplished by stagnating the flow, that is, by closing the drain port, and using the incoming control valve V2 in conjunction with a pressure transducer.

These and other objects, features and advantages of the present invention will be apparent from the following detailed description of illustrative embodiments thereof, which is to be read in connection with the accompanying drawings.

BRIEF DESCRIPTION OF THE DRAWINGS

FIGS. 8a and 8b are electrical schematic diagrams of the comparator/valve/sensor electrical circuit of the flow tester of the present invention which works in conjunction with the fluid flow circuit shown in FIGS. 5-7.

FIGS. 9a-9c are electrical schematic diagrams of the main electrical circuit of the flow tester of the present invention which works in conjunction with the fluid flow circuit shown in FIGS. 5-7 and the electrical circuit shown in FIGS. 8a and 8b.

DETAILED DESCRIPTION OF THE PREFERRED EMBODIMENTS

Figure 1:
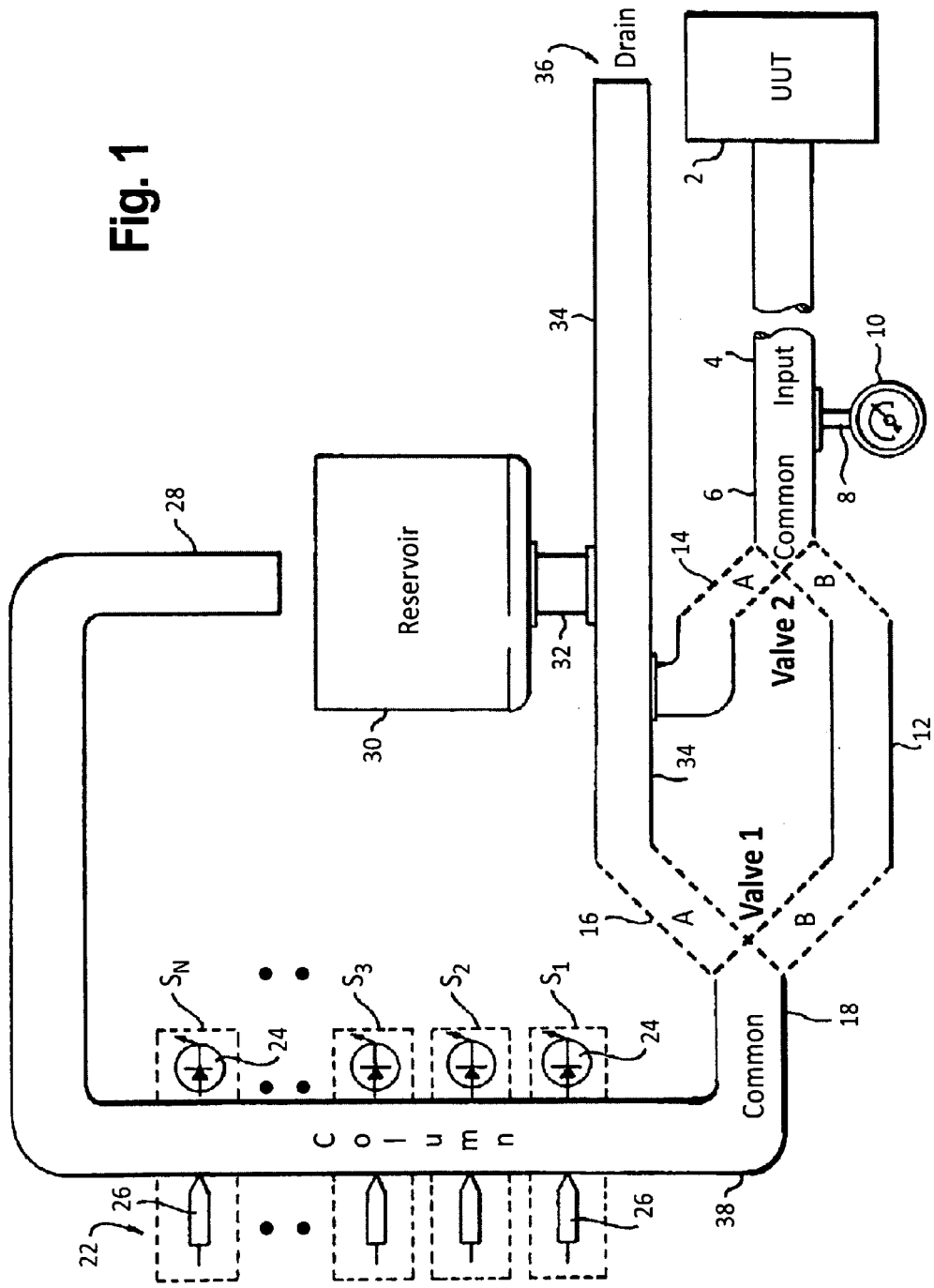
FIG. 1 is pictorial diagram of the flow tester of the present invention employing a passive flush technique.

The present invention is capable of performing precise fluid measurements including but not limited to flow rate, volume, and pressure on a specific unit under test (UUT) 2. The measurement results are updated and displayed in real-time on the built-in display 60 as well as transmitted on an RS-232 serial interface 62, as shown in FIG. 4. The built-in display 60 is also used to provide operation prompts to the user as well as error messages. A fixed function alphanumeric keypad 64 allows the user to input test settings, notations and other pertinent data. A user can make selections by the use of a number of softkeys 66 whose function changes during the operation of the present invention. The function of any softkey 66 is indicated on the display immediately above each softkey. The present invention may also include an internal, non-volatile EEPROM 68, allowing for storage of critical calibration constants. Additionally, previous test results can be stored in an internal memory 70 with a time and date stamp provided by the internal real-time clock 72. The present invention may also include a microcontroller (microprocessor) U3 to direct fluid flow while conducting a specific operation. The microcontroller U3 can operate a set of electrically driven valves V1-V3 (see FIGS. 1 and 2) or V4-V6 (see FIG. 3) that perform the function of directing the fluid flow. Such valves are described herein as electrically operated, single pole, double throw switching fluid valves, although other types of valves may be suitable for use and are envisioned to be within the scope of the present invention. The entire device can be powered by an internal rechargeable battery 74 and/or a main power system 76 through a connector 78, and is designed for minimal power requirements. A pressure transducer 10 is also included and is in fluid communication with the fluid from the UUT 2 and in electrical communication with the microcontroller U3, and senses the pressure of the fluid and provides a corresponding electrical signal to the microcontroller U3 in response to the measured fluid pressure.

FIG. 1 illustrates one configuration of the present invention. Valves 1 and 2 are positional valves each having a common port, port A and port B. The common port of Valve 2 and the UUT 2 are connected by input conduit 4. Pressure gauge 10 is connected inline with input conduit 4 by conduit 8. First vertical column 38 is fitted to the common port of Valve 1. Port B of Valve 1 and Port B of Valve 2 are connected by conduit 12. Port A of Valve 1 is connected to drain 36 by conduit 16 and drain conduit 34. Port A of Valve 2 is connected to drain conduit 34 by conduit 14. The distal end 28 of first vertical column 38 is positioned into reservoir 30. Reservoir 30 is connected to drain conduit 34 by conduit 32. First vertical column 38 has preferably N sensors $S_1$-$S_N$ (where N is an integer) mounted vertically along it, each sensor $S_1$-$S_N$ including a light source 24 and light detector 26.

The present invention is capable of performing flow rate measurements on UUT 2. At the start of a flow rate measurement, the light source 24 of the lowest sensor $S_1$ is powered on and the user is prompted to initiate the fluid flow. Valve 2 is turned to position B, closing off conduit 14 and opening access to conduit 12. Fluid from UUT 2 flows through input conduit 4 into conduit 12 by passing through the common port 6 of Valve 2. Valve 1 is turned to position B, closing off conduit 16 and opening access to common port 18. The fluid rises through the first vertical column 38, approaching the lowest sensor $S_1$. As a column of liquid passes between light source 24 and light detector 26 of sensor $S_1$, the optical light path through the column which had been scattered by the air in the column is now focused by the leading edge (meniscus) of the liquid rising in the column onto the light detector 26 and produces a measurable output. As the lowest sensor $S_1$ detects the leading edge of the advancing fluid, the precision clock 72 is activated. Once the lowest sensor $S_1$ has detected the advancing fluid, it is deactivated and the sensor $S_2$ superior to it is activated. As the superior sensor $S_2$ detects the leading edge of the advancing fluid, the time on the precision clock 72 is noted and the sensor $S_2$ is deactivated, initiating the activation of the next superior sensor $S_3$. As the fluid rises, the leading edge of the fluid sequentially passes each of the sensors $S_1$-$S_N$. The process of time stamping, deactivation and activation is repeated until the uppermost sensor $S_N$ detects the leading edge of the advancing fluid. The flow rate measurement is computed between sensor readings based upon the known volume of the column between sensors $S_1$-$S_N$ and the travel time of the fluid leading edge (meniscus) between successive sensors $S_1$-$S_N$. The measurement is constantly updated as calculations between sensors $S_1$-$S_N$ take place. For example, based upon the known volume of the first vertical column 38, between sensor $S_1$ and sensor $S_2$, and the travel time of the leading edge of advancing fluid between sensor $S_1$ and sensor $S_2$, a calculation is performed by the microprocessor U3 and the interim flow rate is displayed. As the leading edge of the advancing fluid is detected by sensor $S_3$, a new calculation based upon the known volume of the column up to sensor $S_3$ and the travel time of the leading edge is performed and the updated flow rate is displayed. The cycle continues until all sensors $S_1$-$S_N$ have detected the advancing fluid in the column. The fluid exits through the distal end 28 of first vertical column 38 into reservoir 30. Fluid exits reservoir 30 through exit conduit 32, entering drain conduit 34 which is connected to drain 36.

The selective activation of sensors $S_1$-$S_N$ in the present invention corrects problems that residual water droplets and air bubbles caused in the conventional design. Since only one sensor is activated at a time, false readings from multiple sensors detecting air bubbles or water droplets are not present. Furthermore, the selective activation of sensors $S_1$-$S_N$ minimizes the power consumption of the present invention.

The flow tester of the present invention may also perform pressure measurements by including a pressure gauge or transducer 10. The pressure transducer 10 is attached inline (in fluid communication) with the input conduit 4. Valve 1 is turned so that its common port 18 connects with its port A, thereby closing port B and creating a closed end on conduit 12. Valve 2 is turned so that its common port connects with its port B, opening access to conduit 12 from common port 6. Fluid flows from UUT 2 into input conduit 4, through common port 6 into conduit 12 and stops at Valve 1. The closure of Valve 1, port B, and opening of Valve 2, port B, creates a closed atmosphere between the UUT 2 and the pressure transducer 10. The pressure transducer 10 produces a small analog differential voltage, proportional to the sensed pressure in the closed atmosphere. This voltage is fed to an instrumentation amplifier U16 (FIG. 8b) that provides both gain and a singled ended (reference to ground) output voltage. This output voltage is fed to an ADC (analog-to-digital converter) U20 (FIG. 8b) which reports the digital value to the microcontroller U3. The microcontroller software contains a calibration equation that converts the ADC value to PSI (pounds per square inch) pressure. The microcontroller U3 then transfers this value to the display 60.

After a test has been completed, the first vertical column 38 needs to be flushed to prepare for further tests. This can be done by multiple methods. The first method is passive flushing, such as shown in FIG. 1. During passive flushing, Valve 1 is turned so that its common port 18 connects with its port A, thereby closing off conduit 12 and opening access to conduit 16. Fluid then reverse flows from first vertical column 38 through common port 18 into conduit 16. Valve 2 is turned so that is common port 6 connects with its port A, diverting UUT 2 fluid flow from conduit 12 to conduit 14. Fluid exiting conduits 16, 14, and 32 is discharged through conduit 34 and exit the apparatus via drain 36. Passive flushing is accomplished using gravity.

Figure 2:
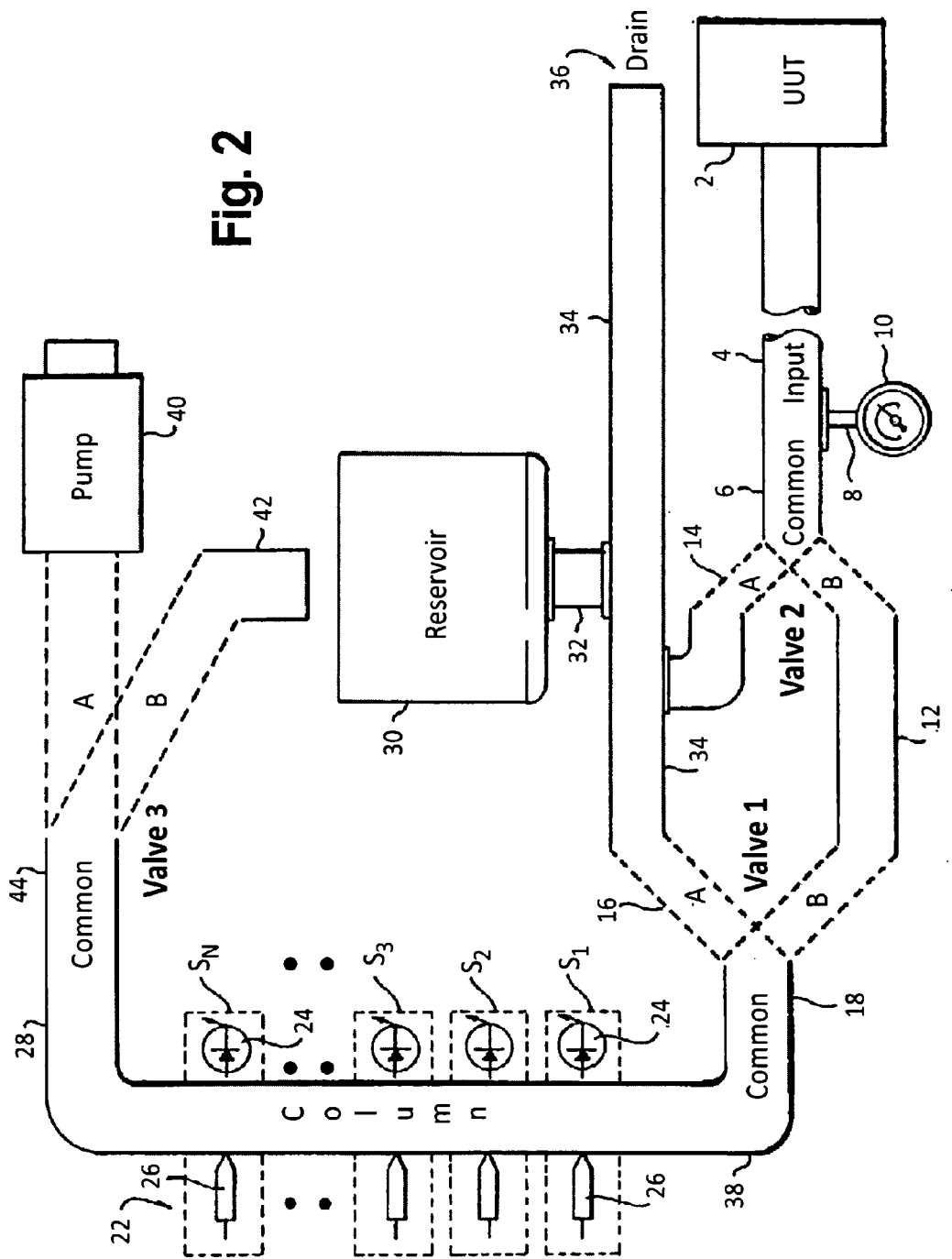
FIG. 2 is pictorial diagram flow tester of the present invention employing an active flush technique.

The process of passive flushing is cost effective but may have problems with residual air bubbles and water droplets. The method of active flushing corrects these problems, and such method is shown in FIG. 2. A third positional valve, Valve 3, and a pump 40 are added to the apparatus. The distal end 28 of vertical column 38 is attached to the common port 44 of Valve 3. Valve exit conduit 42 is attached to port B of Valve 3 and a pump 40 is attached to port A of Valve 3. During a measurement, Valve 3 is turned so that its common port 44 connects with its port B, allowing any advancing fluid exiting first vertical column 38 to drain into the reservoir 30. After the test is complete, Valve 3 is turned so that is common port 44 connects with its port A, closing access to valve exit conduit 42 and opening access to pump 40. (Valves 1 and 2 are in the positions stated previously for passive flushing.) Pump 40 is activated and actively drives air into common port 44 which directs air into the first vertical column 38. The air drives all fluid out of the first vertical column 38 through conduit 34 into drain 36.

Figure 3:
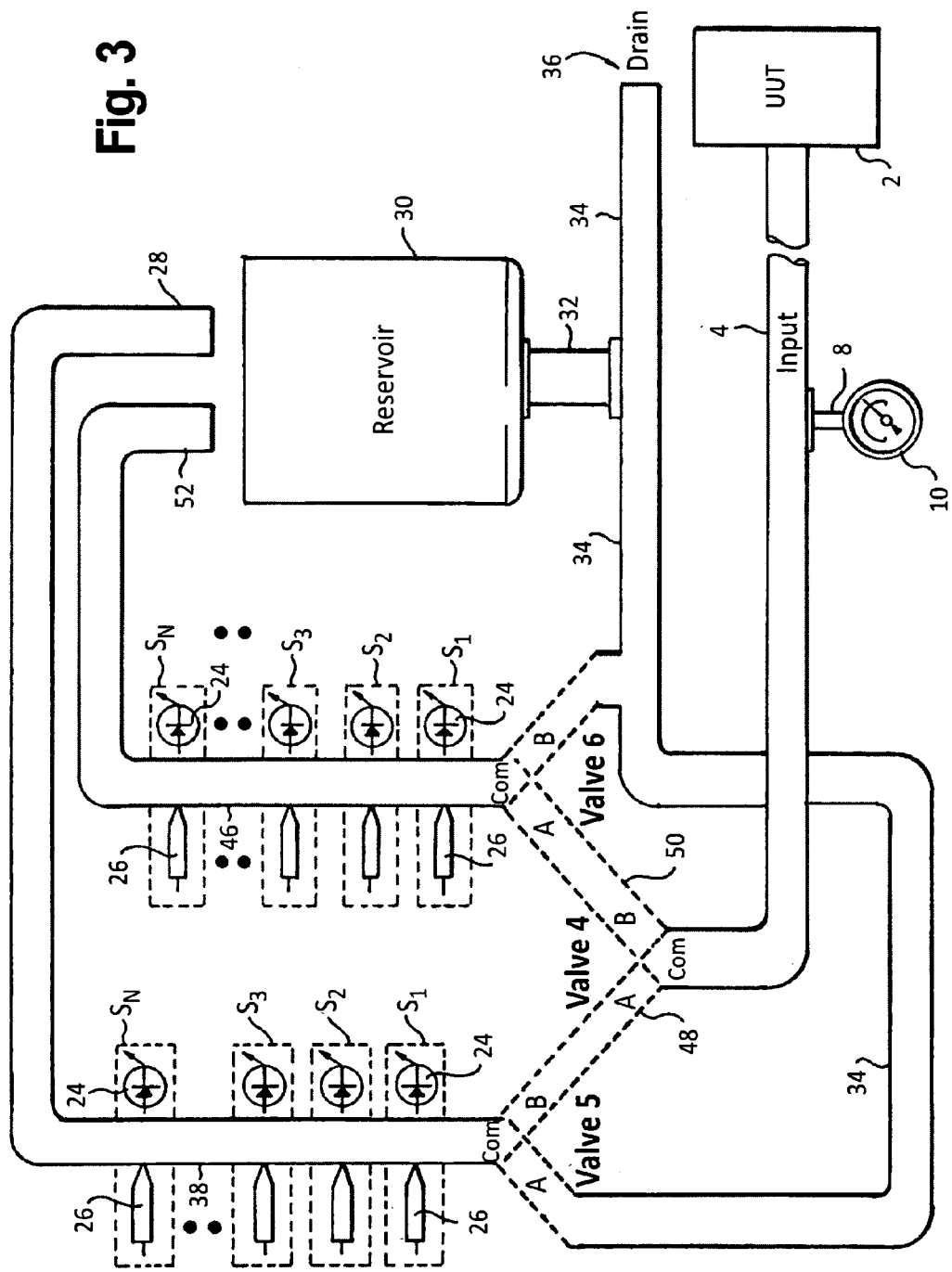
FIG. 3 is pictorial diagram flow tester of the present invention for continuous flow rate measurement.
Figure 4:
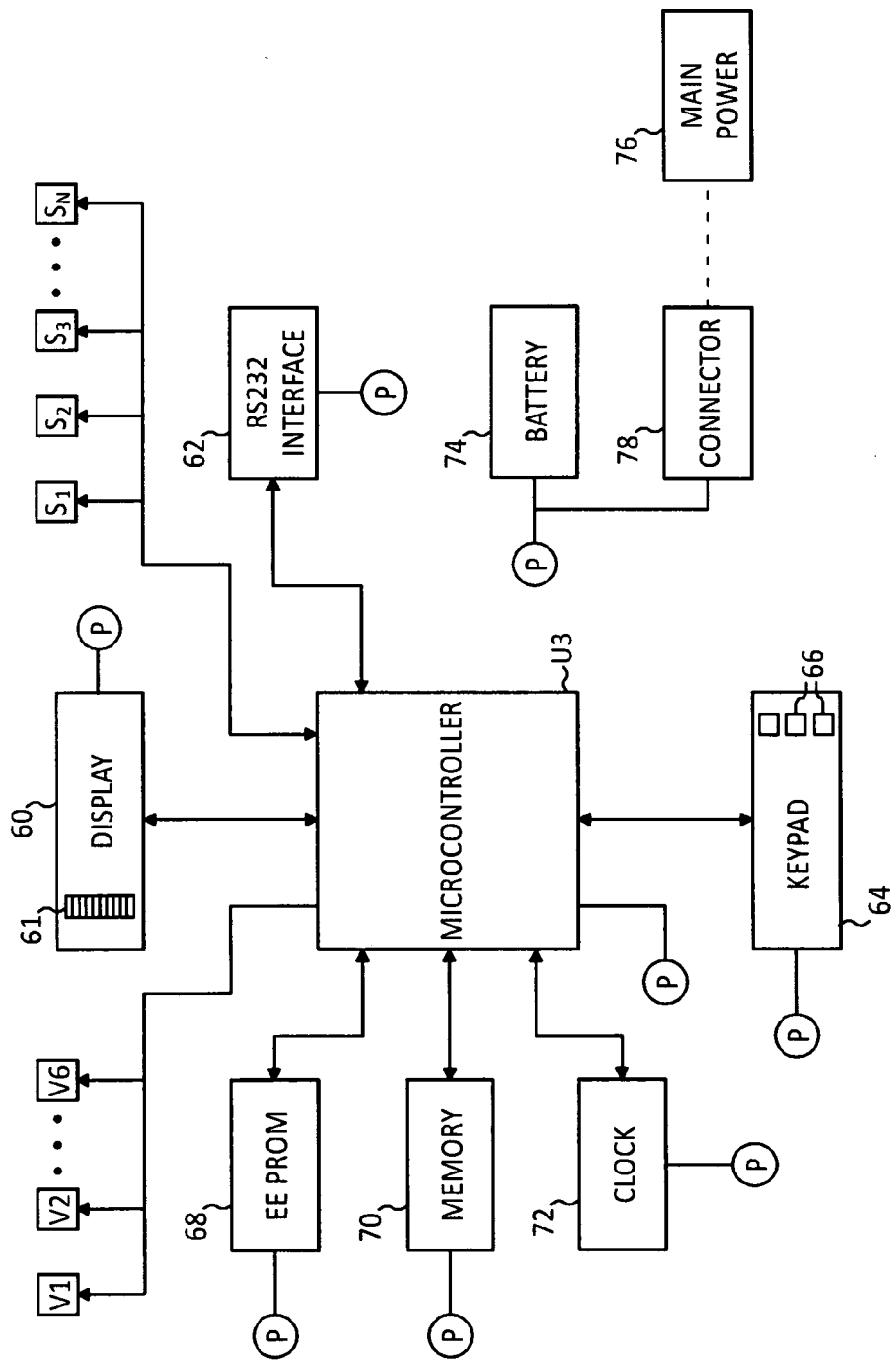
FIG. 4 is a block diagram of one form of the flow tester of the present invention.

The present invention may further include a dual column design, as shown in FIG. 3. Using the single column design shown in FIGS. 1 and 2, single tests may be taken, stopping after each test to drain the system and prepare for a new test. By using a dual column design, it is possible to take continuous flow rate measurements. A second vertical column 46 is added with liquid level sensors $S_1$-$S_N$ in the same configuration as first vertical column 38. The sensors $S_1$-$S_N$ on the two fluid columns 38 and 46 are situated thereon and operate in the same manner as the embodiment of the flow tester described previously and shown in FIG. 1. In the continuous flushing configuration, the distal end of input conduit 4 is coupled to the common port of positional Valve 4. The proximal end of first vertical column 38 is coupled to the common port of positional Valve 5. The proximal end of second vertical column 46 is coupled to the common port of positional Valve 6. Port A of Valve 4 and port B of Valve 5 are connected by conduit 48. Port B of Valve 4 and port A of Valve 6 are connected by conduit 50. Port A of Valve 5 is connected to drain conduit 34. Port B of Valve 6 is also connected to drain conduit 34. The distal end 28 of first vertical column 38 and the distal end 52 of second vertical column 46 are positioned to allow fluid flow into reservoir 30. Reservoir 30 is connected to drain conduit 34 by conduit 32.

Continuous testing is accomplished by alternating testing sites in vertical columns 38, 46. One is used for testing while the other is being drained. For example, if the first vertical column 38 is to be filled and the second vertical column 46 is to be drained, Valves 4-6 can be used to direct the fluid flow from the UUT 2 to the first vertical column 38 and direct the fluid in the second vertical column 46 to the drain 36. Valve 5 is turned so that its common port connects with its port B, opening access to conduit 48. Valve 4 is turned so that its common port connects with its port A, creating a path for advancing fluid from UUT 2 to first vertical column 38. Valve 6 is turned so that its common port connects with its port B, allowing the second vertical column 46 to drain through drain conduit 34 and out drain 36. Similarly, reversing each Valve position will allow fluid to advance to the second vertical column 46 for measurement and will drain first vertical column 38.

The dual vertical column design may also be equipped with an active flushing device (not pictured) by adding two additional valves (not shown, but similar to valve 3 in FIG. 2) to the distal ends 52, 28 of the vertical columns 46, 38 and a Y-fitting or further positional valve (not shown) to the pump 40. The common ports of each such valve are respectively attached to distal ends 52 and 28, such as shown with Valve 3 in FIG. 2. Port A of each valve is connected to an output port on the Y-fitting. Conduit from Port B of each valve is positioned into reservoir 30. When a vertical column is to be actively flushed, the port A of the corresponding valve connected to the distal end of the column to be flushed is opened to direct air from pump 40 therethrough, and the corresponding lower feed valve is turned to the position that directs flow from the column to be flushed to drain conduit 34.

Further descriptions of the embodiments shown in FIGS. 1-3 will now be provided. With respect to flow rate measurements, the present invention uses a precision clock 72 to measure the travel time of the leading edge of a fluid as it fills a precision volume, i.e., columns 38 and/or 46, each of which may be, but is not limited to, a clear (transparent) conduit of known inside diameter mounted in a vertical position. The plurality of sensors $S_1$-$S_N$ (each including a light source 24 and suitable light detector 26) are located at known distances along the vertical column 38, 46, as shown in FIG. 1. As the leading edge of the fluid passes each sensor $S_1$-$S_N$, an updated calculation of the flow rate based on time to fill a known volume is generated by the internal microcontroller U3. A reservoir 30 is provided to collect any excess fluid that might still be delivered to the flow tester of the present invention by the UUT 2 after the test is completed.

A common problem with conventional flow testers is the presence of air bubbles and water droplets remaining in the column from a previous test. The flow tester of the present invention solves this problem with two techniques: adaptive sensing and active flushing.

The adaptive sensing feature will now be explained in further detail. As shown in FIG. 1, one possible implementation of the fluid sensors $S_1$-$S_N$ uses a beam of light such as, but not limited to, visible or infra-red, emitted by a light source 24, such as a light emitting diode (LED), directed across the vertical column 38 onto a suitable detector 26. When air is present in the column 38, the light is scattered and the detector 26 has minimal output. When a column of fluid passes between the light source 24 and the detector 26, the change in the optical path focuses the light onto the light detector 26 and it produces a measurable output signal.

In order to minimize power to extend battery operation time, the flow tester of the present invention only lights one light source 24 at a time in the plurality of sensors $S_1$-$S_N$. This power saving feature has the added benefit of allowing the microcontroller U3 to ignore most air bubbles or water droplets that have remained trapped in the column 38 and are being propelled through the column 38 by the advancing fluid.

As the flow tester of the present invention starts a flow rate measurement, it will turn on the light source 24 in only the lowest sensor $S_1$. At the same time, it will prompt the user to initiate the fluid flow in the UUT 2 to be tested. The flow tester will wait until it detects the leading edge (meniscus) of the fluid crossing the lowest sensor $S_1$. At this time, it will start the precision clock 72.

Now, the light source 24 on sensor $S_1$ is no longer needed and will be turned off. The light source 24 on the next sensor $S_2$ up the column 38 will now be turned on. When the leading edge of the fluid passes sensor $S_2$, the time of the precision clock 72 is noted. Based on the known volume of the column 38 between sensor $S_1$ and sensor $S_2$, and the travel time of the leading edge of the fluid, a calculation is performed and an interim flow rate is displayed. Similar to above, now the light source 24 on sensor $S_2$ is turned off, and the light source 24 on sensor $S_3$ is turned on in anticipation of the leading edge of the fluid. When the leading edge of the fluid passes sensor $S_3$, the new total volume as well as the new total elapsed time are both known. A calculation will now lead to the display of an updated, more precise interim flow rate.

It should be noted that any air bubbles or water droplets that are located more than one sensor-to-sensor spacing above the leading edge of the fluid have absolutely no effect on the readings. Since they are "above" the sensor which has its light on, these bubbles and water droplets will not register on any of the sensors whose light is not yet turned on.

An air bubble or water droplet that is located less than one sensor-to-sensor spacing above the leading edge of the fluid may have a minor effect on the accuracy of the final reading. For example, if a water droplet is located halfway between sensor $S_1$ and sensor $S_2$ just as the leading edge of the fluid passes sensor $S_1$, it will be propelled along with the fluid and may prematurely be detected by sensor $S_2$. This first interim calculation of the flow rate may be erroneously high. However, since this fluid droplet is being propelled at the same rate as the fluid, it will pass the remaining detectors 26 of the sensors at the same rate of speed as the leading edge of the fluid. With a plurality of sensors $S_1$-$S_N$, this first possibly erroneous reading will be "averaged out" and will have a negligible or no effect on the final result.

To allow an incoming fluid to fill the column 38 (see FIG. 1), both valves 1 and 2 have their common port connected to port B. This provides a direct path from the Input, where the UUT 2 is connected, to the column 38. Once a flow rate test is completed, the column 38 needs to be flushed to allow for further tests. One method of flushing the column 38 is via a passive flush.

As shown in FIG. 1, to execute a passive flush with the flow tester of the present invention, Valve 1 has its common port connected to its A port. Valve 2 also has its common port connected to its A port. This allows fluid in the column 38 to drain out to the Drain output 36 via gravity. Any fluid under pressure in the Input port will also drain out to the Drain 36. This implementation, while low in cost, can have problems with residual air bubbles and water droplets. This possible problem can be solved by using an active flush technique.

Active flush with the flow tester of the present invention introduces a third valve and a pump 40 (see FIG. 2). During the measurement cycle of flow rate, Valve 3 has its common port connected to its B port. Any excess fluid is drained into the reservoir 38. When it is time to flush the column 38, the common port of Valve 3 is connected to the pump 40. The pump 40 will actively drive air into the column 387 and flush it of fluid.

A dual column design of the flow tester of the present invention introduces yet another new concept in flow rate measurement—that of continuous flow rate measurement. With the single column design of the flow tester shown in FIGS. 1 and 2, it was necessary to alternately fill and drain the column 38 with fluid while taking a measurement. Once the column 38 was filled, the measurement stopped to allow time for the column to drain. Next, the cycle of filling the column 38 while taking another measurement and then allowing time for the fluid to drain is started all over. The dual column design of the present invention allows a flow rate measurement to be taken continuously (see FIG. 3).

FIG. 3 shows a dual column flow tester with passive flush, formed in accordance with the present invention. It should be realized that the dual column design is also compatible with the active flush method and structure of the present invention. Each column 38, 46 is instrumented with a plurality of liquid level sensors $S_1$-$S_N$. Valves 4, 5 and 6 direct the flow of fluid in the following manner.

Assume at start that column 38 is to be filled and column 46 is to drain. Valve 4 has its common port connected to port A. Valve 5 has its common port connected to port B. Hence, the Input (i.e., fluid input) is connected to column 38. Valve 6 has its common port to connected to port B and hence is draining.

Once column 38 is filled, all three valves are moved to their alternate position. Valve 4 will have its common port connected to port B, and Valve 6 will have its common port connected to port A. Hence, the Input will now be connected to column 46. Valve 5 will now have its common port connected to its port A and hence column 38 will now drain.

By alternating the valve settings as described above, it is now possible to continuously measure flow rate in one column 38 or 46 while draining the fluid in the other column 38 or 46.

An additional feature of the flow tester of the present invention is a realtime bar graph 61 on the display 60 that is keyed to the plurality of sensors $S_1$-$S_N$. As the fluid level leading edge is detected at successive detectors 26 of the sensors, another segment of the bar graph 61 on the display 60 is turned on, giving the user feedback as to the progression of the measurement.

The flow tester of the present invention can also measure fluid pressure. By inclusion of a pressure transducer 10 in the Input line and by setting the valves to internally block the Input line, the flow tester of the present invention can read the pressure on the connected UUT 2.

The pressure transducer 10 produces a small analog differential voltage, proportional to the sensed pressure. This voltage is fed to an instrumentation amplifier U16 that provides both gain and a singled ended (reference to ground) output voltage. This output voltage is fed to an ADC (analog-to-digital converter) U20 which reports the digital value to the microcontroller U3. The microcontroller software contains a calibration equation that converts the ADC value to PSI (pounds per square inch) pressure. The microcontroller U3 then transfers this value to the display 60.

One of the many features of the flow tester of the present invention is that, due to the pulsating nature of the pressure being measured (the flow tester is particular adapted to work with medical infusion pumps), it will hold the peak value and use that as the displayed value.

Another feature of the flow tester of the present invention is that it will warn the user with either or both a visual and audio warning on the display 60 or with a "beeper" U2 (FIG. 9a) when the pressure read exceeds the rated range of the flow tester.

Yet another feature of the flow tester of the present invention is a linear bar graph display (display 60) that shows in realtime a bar 61 whose height is proportional to the measured pressure.

The present invention is also capable of making precise volume delivery measurements in the continuous measurement design (dual column design shown in FIG. 3). A continuous fluid flow from the UUT 2 can be shunted back and forth between the first vertical column 38 and the second vertical column 46 while the microcontroller U3 tracks ongoing detections at each sensor $S_1$-$S_N$. Since the volume of the columns 38, 46 is calibrated and the distance between each sensor $S_1$-$S_N$ is known, a simple calculation performed by the microprocessor U3 can determine the total volume of fluid that has been input to the flow tester of the present invention.

A preferred form of the flow tester of the present invention is shown in FIGS. 5-9 and will now be described in detail. The flow tester of the present invention is a compact instrument which may measure fluid flow of extremely minute volumes, such as on the order of 10 milliliters per hour, with high precision. Preferably, there are ten fluid sensors 22a-22j (U5-U14 in FIG. 8a) which are disposed sequentially at predetermined spaced intervals along the measuring column 38. Because the flow tester of the present invention can precisely measure the flow rate of extremely small volumes of fluid, the flow tester is particularly adapted for measuring the fluid flow rates of medical devices, in particular, infusion pumps. Another advantage of the flow tester of the present invention is that it may remain connected to the infusion pump or other device under test, as will be explained in greater detail below.

Figure 5:
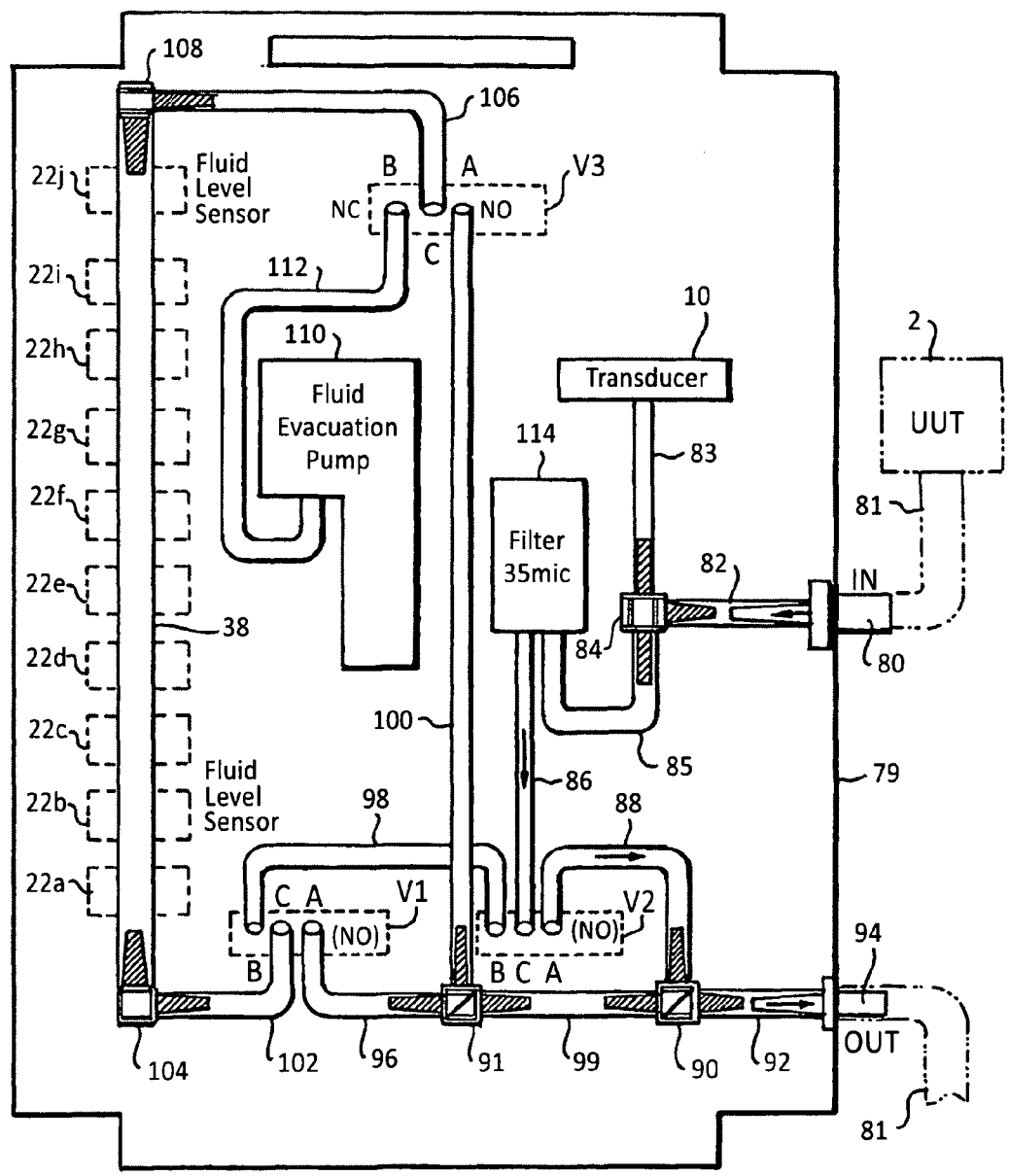
FIG. 5 is a pictorial illustration of a fluid flow circuit of a flow tester formed in accordance with another form of the present invention, and illustrating the fluid flow circuit in a standby mode.
Figure 6:
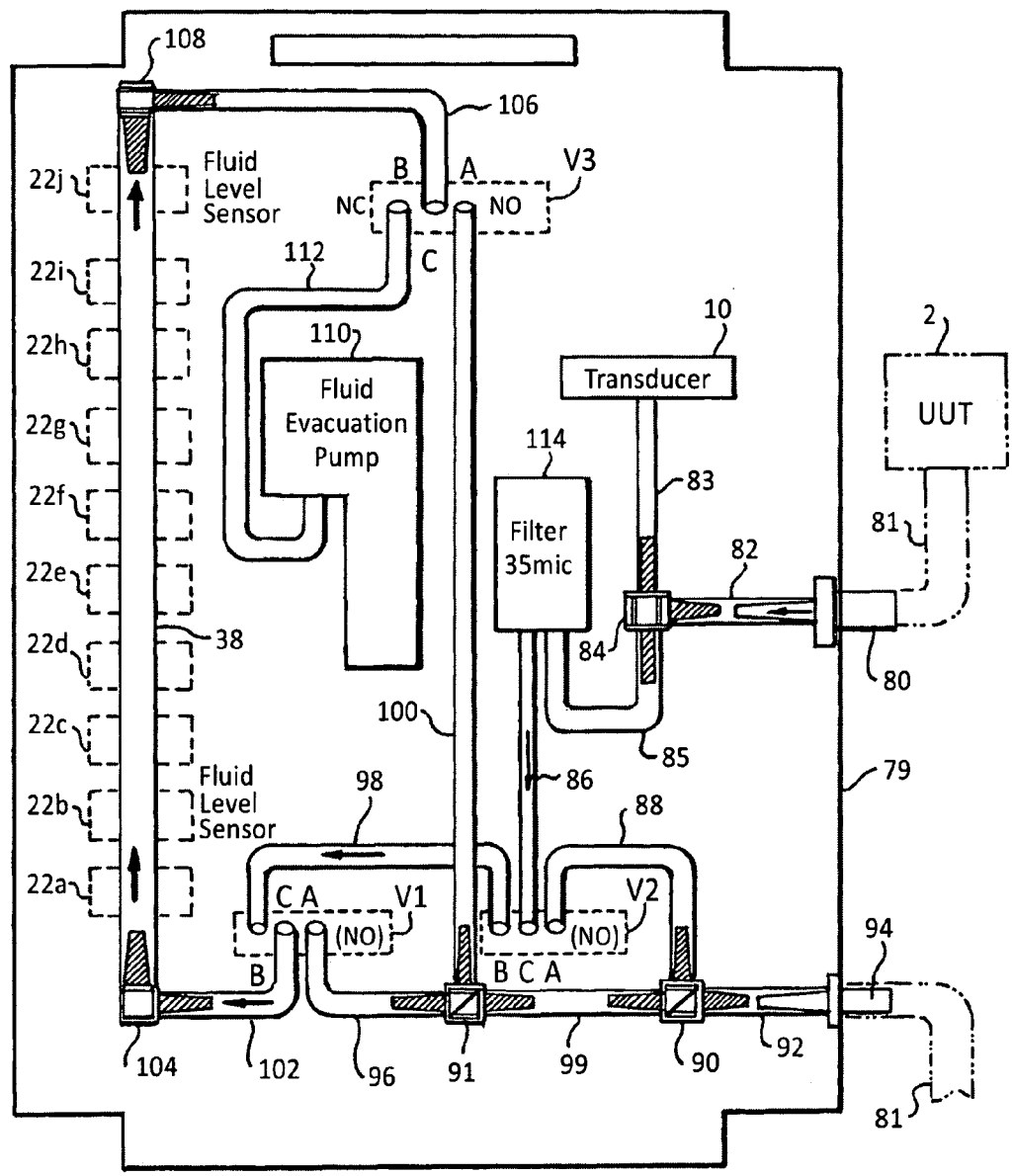
FIG. 6 is a pictorial illustration of the fluid flow circuit of the flow tester shown in FIG. 5, and illustrating the fluid flow circuit in a flow measurement mode.
Figure 7:
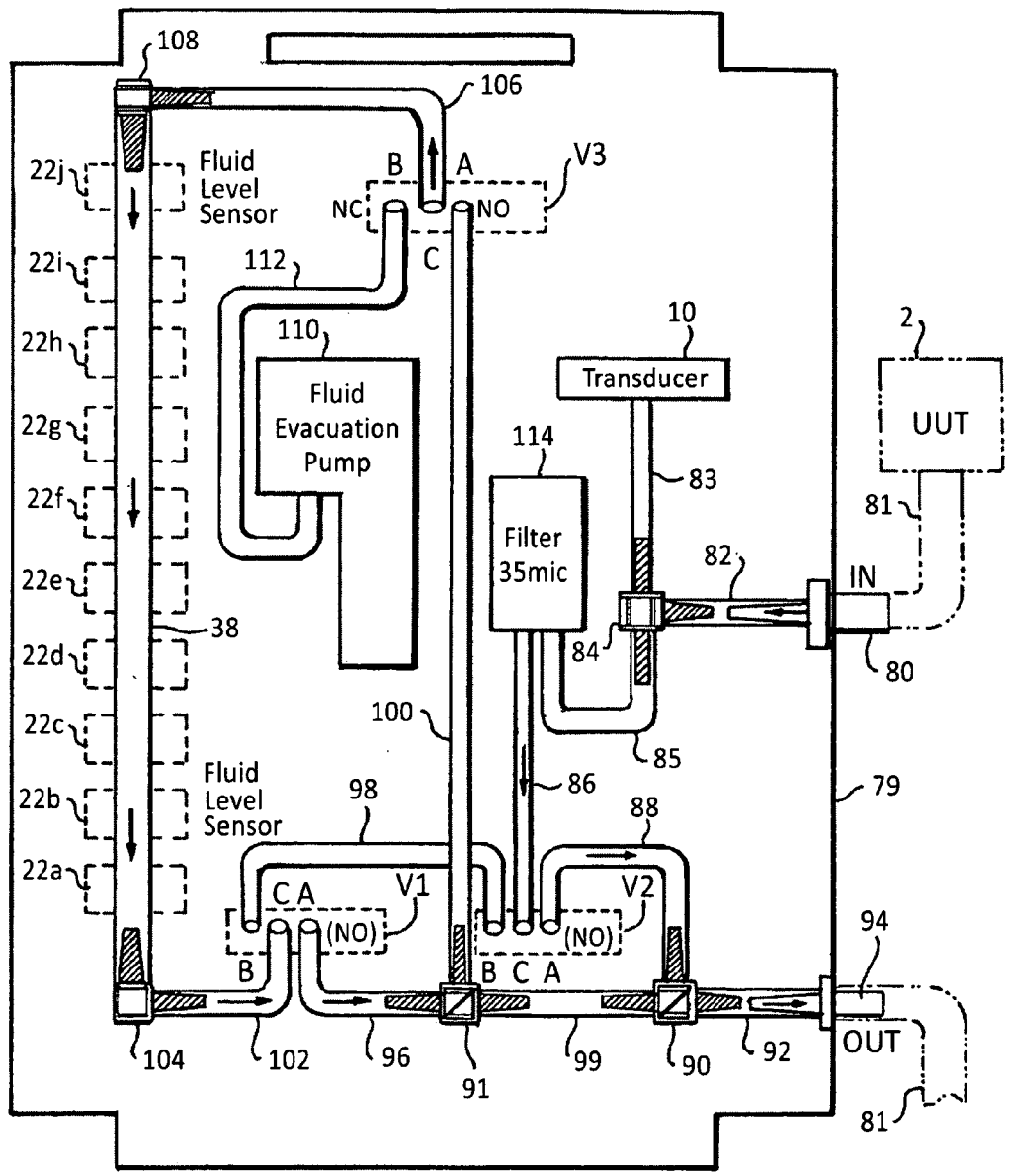
FIG. 7 is a pictorial illustration of the fluid flow circuit of the flow tester shown in FIG. 5, and illustrating the fluid flow circuit in a drain mode.

FIGS. 5-7 illustrate the fluid flow circuit of the flow tester of the present invention, in its preferred form. The fluid flow circuit includes a series of control valves V1, V2, V3 which are configured as single pole, double throw, hydraulic switches (although other configurations are suitable), and a series of interconnecting conduits. The control valves V1-V3 and interconnecting conduits selectively direct the flow of fluid from a device under test, which is connected to the flow tester, through the flow rate measuring column and back out to a drain port. The valves and interconnecting conduits are preferably mounted on one side of a printed circuit board (or other supporting substrate) 79, the other side of which has mounted thereon the components of the electrical circuit which control the operation of the valves V1-V3 and sensors 22a-22j, the circuit being shown in FIGS. 8a and 8b of the drawings. The printed circuit board 79 on which the fluid flow circuit and the electrical circuit are mounted is preferably disposed vertically so that, in particular, fluid flow rate measuring column 38 is disposed vertically.

Turning initially to FIG. 5 of the drawings, the fluid flow circuit of the flow tester of the present invention is illustrated, with the valves V1-V3 positioned by the electrical circuit such that the flow tester is in a standby mode. The arrows which are shown in the interconnecting conduits indicate the flow of fluid for the various modes of operation illustrated by FIGS. 5-7.

As shown in FIG. 5, a device to be tested, such as a medical infusion pump, is connected to the Input port 80 (IN) of the flow tester. More precisely, the flow tester of the present invention is connected in series with tubing or a conduit 81 (shown in dashed lines) connected to the output of the infusion pump or other device 2 (shown in dashed lines). The fluid flows from the infusion pump or other unit under test (UUT) 2, through the Input port 80 and into a conduit 82 connected to the Input port 80. Conduit 82 is connected to a first port of a T-coupler (three-way coupler) 84. The T-coupler has a second port which is connected to a pressure transducer 10 through a conduit 83 so that the flow tester of the present invention may measure the pressure of the fluid from the UUT 2. An output port of the T-coupler 84 is connected to the input port of an optional filter 114, preferably, a 35 micron filter, whose output port is connected to another conduit 86 which, in turn, is connected to the common port C of control valve V2. Control valve V2 also includes a normally open port A and a normally closed port B.

In the standby mode, valve V2 is in a state controlled by the electrical circuitry such that the common port C is connected to the normally open port A to allow fluid to flow therethrough. Another conduit 88 is connected to a first port of a T-coupler 90. A second port of the T-coupler 90 is connected to another conduit 92 which is connected to the drain port 94 ("OUT"). The remaining portion of conduit 81 of the infusion pump or other UUT 2 is connected to the drain port 94.

A third port of the T-coupler 90 is connected to a conduit 99 which, in turn, is connected to a first port of another T-coupler 91. A second port of the T-coupler 91 is connected to a conduit 96 which, in turn, is connected to a normally open port A of control valve V1. The normally closed port B of control valve V1 is connected to a conduit 98 which is also connected to the normally closed port B of control valve V2. The third port of the T-coupler 91 is connected to a conduit 100 which is also connected to the normally open port of control valve V3.

The common port C of control valve V1 is connected to a conduit 102 which is also connected to a first port of a right angle (90 degree) coupler 104. The common port C of control valve V3 is also connected to a conduit 106 which is connected to a first port of another right angle coupler 108. The second port of the first right angle coupler 104 and the second port of the second right angle coupler 108 are connected to opposite axial ends of a vertically disposed, fluid flow measuring column 38. Preferably, fluid flow measuring column 38 is a transparent tube so that light may shine transversely therethrough.

Situated along the axial length of the fluid flow column 38 is a plurality of sensors 22a-22j (in this case, 10 sensors are preferably used), each sensor being spaced a predetermined distance from its next adjacent sensor. The sensors 22a-22j are used to measure the flow of fluid through the column 38. Each sensor 22a-22j includes a light source 24, such as a light emitting diode, and a light sensor or detector 26 (see FIGS. 1-3 of the drawings). Light from the light source 24 of each sensor 22a-22j is received by the corresponding light detector 26 of a respective sensor 22a-22j, the light passing through the light transmissive side wall and interior bore of the fluid flow column 38.

In a preferred form of the present invention, the flow tester may include a fluid evacuation air pump 110. The fluid evacuation air pump 110, when energized, pumps air into the conduits of the flow tester to evacuate fluid in fluid flow measuring column 38. The output of the fluid evacuation pump 110 is connected to a conduit 112 which is connected to the normally closed port B of control valve V3.

In the standby mode of operation, as shown in FIG. 5, the flow tester of the present invention continuously directs fluid from the medical device or unit under test (UUT) 2 into the fluid flow tester through the input port 80 and out the drain port 94, back into the conduit 81 of the UUT 2 to which the flow tester is connected in series. No tests are performed by the flow tester of the present invention, and the direction of flow of fluid through the flow tester bypasses most of the conduit "plumbing" of the fluid flow circuit. More specifically, fluid is directed from the input port 80, through conduit 82, through the T-coupler 84, through conduit 85, the filter 114, conduit 86 and to the common port C of control valve V2. Control valve V2 is in a state, controlled by the electrical circuitry, such that common port C is connected to (which means it is in fluid communication with) port A, so that fluid is directed through port A of valve 2, through conduit 88 and into the first port of T-coupler 90 and out the second port of T-coupler 90 and to the drain port 94 through conduit 92. Valve V1 is in a state such that port A is open so that fluid may not flow therethrough via conduit 96, and similarly, control valve V3 is in a state, controlled by the electrical circuitry, such that port A is open so that fluid from the third port of T-coupler 91 cannot flow through control valve V3 via conduit 100. Therefore, the fluid must flow through the second port of T-coupler 90, through conduit 92 and drain port 94. In this configuration, the flow tester provides a bypass path for fluid flow through the fluid flow circuit, without involving a major portion of the rest of the fluid flow circuit of the flow tester.

FIG. 6 of the drawings illustrates the flow measurement on mode of the flow tester. Again, arrows depict the direction of fluid flow through the fluid flow circuit. In this mode, control valve V2 is in a state set by the electrical circuit such that its common port C is connected to port B. Control valve V1 is set to a state in which its port B is connected to its common port C. Control valve V3 is in an "off" state, set by the electrical circuitry, such that it is not connected to the air pump conduit 112 but has its common port C connected to its port A. Thus, the upper axial end of column 38 is connected to the drain port 94 through coupler 108, conduit 106, valve V3, conduit 100, coupler 91, conduit 99, coupler 90 and conduit 92, and can vent to the atmosphere to allow atmospheric pressure within fluid flow rate measuring column 38 above the rising fluid. In the configuration described above and shown in FIG. 6 of the drawings, fluid from the UUT 2 passes through input port 80, conduit 82, and three-way coupler 84. The fluid then flows into conduit 85 and through the optional filter 114, and then through conduit 86 to the common port C of control valve V2.

As mentioned previously, control valve V2 is in a state in which the control port C is coupled to port B so that fluid flows through port B of control valve V2 and into conduit 98 to port B of control valve V1.

As also mentioned previously, control valve V1 is in a state in which port B is coupled to common port C such that fluid flows from common port C of valve V1 into conduit 102 and through right angle coupler 104 situated at the bottom axial end of fluid flow rate measuring column 38.

The fluid rises in column 38, and the vertical movement of the meniscus of the fluid in column 38 is detected sequentially by each sensor 22a-22j, such as described earlier with respect to the embodiment shown in FIGS. 1 and 2 of the drawings.

In the flow measurement on mode, valve V3 is in a state, set by the electrical circuitry, whereby its common port C is connected to its port A so that any fluid passing the top most sensor 22j will flow through right angle coupler 108 and into conduit 106, and will pass through control valve V3 into conduit 100, T-coupler 91, conduit 99, T-coupler 90, conduit 92 and drain port 94.

When the meniscus of the fluid in column 38 passes the tenth (highest) sensor 22j, the microcontroller U3 of the flow tester of the present invention receives a signal therefrom and automatically initiates a drain routine to place the flow tester in a drain mode.

The fluid flow circuit of the flow tester in the drain mode is illustrated by FIG. 7 of the drawings. Here, the valves V1-V3 are positioned in particular states by the electrical circuitry to allow the fluid in column 38 to be drained. In the drain operational mode, valve V2 is in a state such that its common port C is connected to its port A. This allows any fluid from the unit under test (UUT) 2 which continues to flow into input port 80 of the flow tester to bypass the rest of the fluid flow circuit of the flow tester and to be directed out of the drain port 94. More specifically, the fluid which continues to flow into input port 80 passes through conduit 82, three-way coupler 84, conduit 85, the optional filter 114, conduit 86, control valve V2, where the common port C is connected to port A, conduit 88, three-way coupler 90, conduit 92 and drain port 94.

In the drain mode, control valve V1 is in a state such that its common port C is connected to its port A to allow the fluid in column 38 to drain through right angle coupler 104, conduit 102, valve V1, where its common port C is connected to its port A, conduit 96, T-coupler (three-way coupler) 91, conduit 99, T-coupler (three-way coupler) 90, conduit 92 and drain port 94. Thus, the fluid in fluid flow measuring conduit 38 may drain passively, by gravity. However, if air pump 110 is included, then valve V3 is placed in a state in which its common port C is connected to its port B. Then, the fluid evacuation pump 110 is energized, and air flows through conduit 112 connected to the output of the pump 110 and into port B of control valve V3. Since the common port C of control valve V3 is connected to port B, the air, under pressure, is forced through conduit 106, through right angle coupler 108 and into the upper axial end of column 38, forcing the fluid therefrom.

The electrical circuit of the flow tester of the present invention, in its preferred form, will now be described. Reference should initially be made to FIGS. 8a and 8b of the drawings.

Referring initially to FIG. 8a, it will be seen that the comparator/valve/sensor circuit portion of the electrical circuit includes a plurality of optical sensors which include light detectors or sensors U5-U14. Ten light detectors are preferably used, although the invention is not limited to this particular number. Ten light emitting diodes D1-D10 act as the light sources 24 for each of the sensors 22a-22j.

The output of each light detector U5-U14 is coupled to one input of a corresponding comparator (U2C, U2D, U3A, U3B, U3C, U3D, U4A, U4V, U4C and U4D). The other input of each comparator is provided with a reference voltage determined by a voltage divider network having fixed resistor R22 and potentiometer R21 connected together in series. The output signal from each comparator U2C-U4D is provided to the microcontroller U3 through a connector J2.

When a light detector U5-U14 detects the meniscus of the fluid level in column 38, by receiving an increased intensity of light than it had received earlier from its corresponding light emitting diode D1-D10 through the column 38 when the fluid had not risen in the column to the level of the sensor, and provides a higher voltage to the input of its corresponding comparator U2C-U4D to which it is connected. The increased voltage rises above the threshold voltage provided to the other input of the comparator, and the state of the output signal from the corresponding comparator U2C-U4D changes. The changed-state comparator output signal is provided to the microcontroller U3 through connector J2.

Each of the light emitting diodes D1-D10 are energized sequentially and are de-energized sequentially, as stated previously. The energization of each light emitting diode D1-D10 is controlled by the microcontroller U3. This conserves electrical power and extends battery life, and also minimizes inaccuracies caused by air bubbles or pockets in the fluid rising in column 38. In FIG. 8a, a voltage regulator U1 is also shown.

Turning now to FIG. 8b of the drawings, the pump control circuit 120 is shown. The pump control circuit 120 is basically a switching circuit using a field effect transistor (FET) which controls the energization of the evacuation pump 110 shown in FIGS. 5-7.

The valve controller circuit 122 for operating the control valves V1-V3 is also shown in FIG. 8b. The circuit 122 includes four switching circuits, each having a field effect transistor (FET), which energizes or de-energizes an associated relay. By the pump control circuit 120 and the valve controller circuit 122 are controlled by signals provided by the microcontroller U3. It should be noted here that switches SW1-SW5 are provided to selectively short the drain and source of each of the FETs in the pump control circuit 120 and the valve controller circuit 122, and are provided for diagnostic purposes (testing the operation of the flow tester of the present invention).

As also shown in FIG. 8b of the drawings, several circuits are includes which provide voltages references for the operation of the circuit. More specifically, operational amplifier U15 is configured to provide a 4.5 volt reference, a voltage reference U18 provides a 2.5 volt reference, and an operational amplifier U19 is configured to provide an 838 millivolt reference.

The circuit of the flow tester shown on FIG. 8b also includes a pressure transducer 10, which provides an output signal to an instrumentation amplifier U16. The output signal from instrumentation amplifier U16 is provided to the input of a 16 bit, 2 channel analog-to-digital (A/D) converter U20.

Figure 9C:
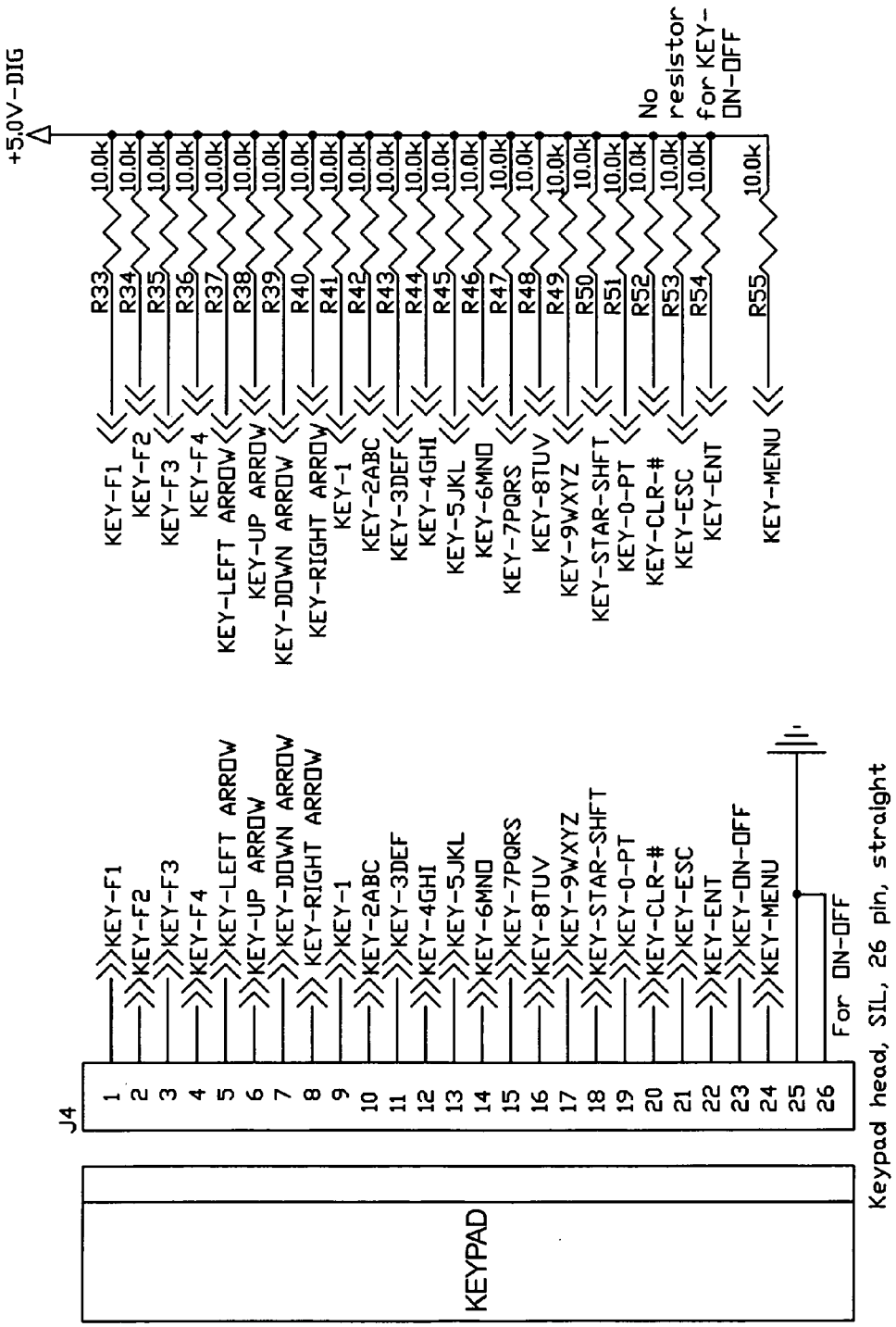

Reference now should be had to FIGS. 9a-9c, which show the main electrical circuit of the flow tester of the present invention, which works in conjunction with the electrical circuits shown in FIGS. 8a and 8b and the fluid flow circuit shown in FIGS. 5-7. In FIG. 9a, it is shown that the main electrical circuit for the flow tester includes a power on/off softkey circuit 124 to which battery terminals PAD5 and PAD6 are connected, and a power jack PJ1 (for supplying external power to the flow tester) is provided. The power on/off circuit 124 includes a 2.5 volt specified power trench MOSFET circuit (Part No. FDN338 manufacturered by Fairchild Semiconductor) and a 20 volt N-channel power trench MOSFET circuit (Part No. FDV305N manufactured by Fairchild Semiconductor).

A 5 volt regulator circuit 126 which includes a DC/DC switching regulator U4 receives the unregulated power from the power on/off circuit 124 and provides a regulated output.

The microcontroller U3 is shown in FIG. 9a, as well as its interconnection to the various other components of the electrical circuit of the flow tester. Preferably, the microcontroller U3 is a 64/80 pin, 1 Mbit, enhanced flash microcontroller with a 10 bit A/D and having Part No. PIC18F8627 manufactured by Microchip Technology, Inc. of Chandler, Ariz., although other microcontrollers and microprocessors may be suitable for use.

As also shown in FIG. 9a, the electrical circuit of the flow tester preferably includes a serial data port circuit having an RS232 line driver/receiver U5, which connects to connector P1. Furthermore, the circuit, as mentioned previously, connects to a liquid crystal display 60 which is controlled by microcontroller U3 through connector J1. A contrast adjust circuit 128 for the liquid crystal display 60 includes a precision CMOS operational amplifier U1A. Furthermore, an electronic transducer U2 (i.e., the "beeper" referred to earlier) is included to provide an audible signal to the user of the flow tester.

Turning now to FIG. 9b of the drawings, it can be seen that the circuit further includes an EEPROM (Electrically Erasable Programmable Read Only Memory) U6 for storage of calibration constants and parameters and some test results, another voltage regulator U10 which provides a regulated 3.3 volts, a flash memory U11, and a level translator circuit U12 for operation with the flash memory.

Also, a real time clock circuit U8 is provided which provides a precise output signal to the microcontroller U3 for measuring the flow rate of the fluid in column 38.

The main electrical circuit also connects through 16 bit I/O port expanders U7, U9 to the comparator/valve/sensor circuit shown on FIGS. 8a and 8b through connector J3.

FIG. 9c shows the connection of the keypad 64 having softkeys 66 to the electrical circuit through connector J4.

Although the operation of the flow tester of the present invention is to detect the meniscus of the fluid rising in column 38, it should be noted that the thresholds for detecting the fluid which is provided to comparators U2C-U4D by the voltage divider consisting of potentiometer R21 and resistor R22 may be adjusted to detect the velocity of bubbles entrapped in the fluid in determining the flow rate of the fluid through column 38.

The flow tester of the present invention is a compact unit which precisely measures the flow rate of small volumes of fluid and is, therefore, particularly adapted for use with medical devices, such as intravenous infusion pumps which require calibration periodically to determine if the pump is functioning properly. The flow tester advantageously may remain connected to the infusion pump and need not be disconnected during normal operation of the infusion pump.

The flow tester of the present invention is simple to operate and is a compact instrument so as not to be cumbersome or occupy precious space in a hospital environment.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A medical infusion pump analyzer, which comprises:
   an input port for receiving therethrough fluid from an infusion pump under test;
   a drain port for draining fluid from the analyzer;
   a tubular fluid flow rate measuring column in fluid communication with the input port for measuring the flow rate of the fluid received by the analyzer through the input port, the fluid flow rate measuring column defining an interior axial bore for the passage of fluid therethrough, the bore having a predetermined and known volume;
   a plurality of sensors situated in proximity to and at least along a portion of the axial length of the fluid flow rate measuring column, the plurality of sensors including adjacent sensors, the adjacent sensors being spaced apart from each other by a predetermined distance along the axial length of the measuring column, the sensors detecting the flow of fluid through the fluid flow rate measuring column and generating signals in response thereto;
   a first valve in fluid communication with the fluid flow rate measuring column, the first valve being controllable to direct the fluid to flow into the fluid flow rate measuring column;
   at least a second valve in fluid communication with the drain port, the at least second valve being controllable to direct fluid from the fluid flow rate measuring column to the drain port;
   a circuit for measuring the time interval it takes for the fluid to flow from a first position in the measuring column which is in alignment with a first sensor of the plurality of sensors to a second position in the measuring column which is in alignment with a second sensor of the plurality of sensors which is adjacent to the first sensor, and for calculating the flow rate of the fluid in the measuring column based on the measured time interval and the known volume of the bore of the fluid flow rate measuring column and wherein the sensors of the plurality of sensors are sequentially energizable along the axial length of the fluid flow rate measuring column, and wherein only one sensor of the plurality of sensors is energizable at any one time.

2. A medical infusion pump analyzer as defined by claim 1, which further comprises:
   a pressure transducer, the pressure transducer being in fluid communication with the input port, the pressure transducer measuring the pressure of fluid received through the input port from an infusion pump under test.

3. A medical infusion pump analyzer as defined by claim 1, wherein the sensors are adjustable to detect movement of at least one of a meniscus of the fluid flowing in the fluid flow rate measuring column and an air bubble in the fluid, the air bubble moving axially in the bore of the fluid flow rate measuring column with the fluid.

4. A medical infusion pump analyzer as defined by claim 1, which further comprises:
   a fluid evacuation pump, the fluid evacuation pump being selectively in fluid communication with the fluid flow rate measuring column to force fluid therefrom.

5. A fluid flow tester for testing the flow rate of fluid from a device under test, which comprises:
   an input port for receiving fluid from the device under test;
   a drain port for draining fluid from the fluid flow tester;
   a tubular fluid flow rate measuring column in fluid communication with the input port for measuring the flow rate of the fluid received by the fluid flow tester through the input port, the fluid flow rate measuring column defining an interior axial bore for the passage of fluid therethrough, the bore having a predetermined and known volume;
   a plurality of sensors situated in proximity to and at least along a portion of the axial length of the fluid flow rate measuring column, the plurality of sensors including adjacent sensors, the adjacent sensors being spaced apart from each other by a predetermined distance along the axial length of the measuring column, the sensors detecting the flow of fluid through the fluid flow rate measuring column and generating signals in response thereto;
   a first valve in fluid communication with the fluid flow rate measuring column, the first valve being controllable to direct the fluid to flow into the fluid flow rate measuring column;
   at least a second valve in fluid communication with the drain port, the at least second valve being controllable to direct fluid from the fluid flow rate measuring column to the drain port;
   a circuit for measuring the time interval it takes for the fluid to flow from a first position in the measuring column which is in alignment with a first sensor of the plurality of sensors to a second position in the measuring column which is in alignment with a second sensor of the plurality of sensors which is adjacent to the first sensor, and for calculating the flow rate of the fluid in the measuring column based on the measured time interval and the known volume of the bore of the fluid flow rate measuring column and wherein the sensors of the plurality of sensors are sequentially energizable along the axial length of the fluid flow rate measuring column, and wherein only one sensor of the plurality of sensors is energizable at any one time.

6. A fluid flow tester as defined by claim 5, which further comprises:
   a plurality of conduits, the conduits being in fluid communication with the input port, the drain port, the first valve, the at least second valve and the fluid flow rate measuring column, the conduits partially defining with the first valve and the at least second valve a plurality of fluid flow paths, the plurality of fluid flow paths including a first fluid flow path between the input port and the fluid flow rate measuring column, a second fluid flow path between the fluid flow rate measuring column and the drain port, and a third fluid flow path between the input port and the drain port.

7. A fluid flow tester as defined by claim 6, wherein the third fluid flow path is a bypass fluid flow path through at least some of the conduits which prevents fluid from entering the fluid flow rate measuring column.

8. A fluid flow tester as defined by claim 6, which further comprises:
   a pressure transducer, the pressure transducer being in fluid communication with the input port; and wherein the plurality of fluid flow paths includes a fourth fluid flow path, the fourth fluid flow path being a stagnating fluid flow path between the pressure transducer and the input port.

9. A fluid flow tester as defined by claim 5, which further comprises:

a fluid evacuation pump, the fluid evacuation pump being selectively in fluid communication with the fluid flow rate measuring column to force fluid therefrom.

10. A fluid flow tester as defined by claim 5, wherein the fluid flow rate measuring column includes a side wall which is light transmissive; and wherein each sensor of the plurality of sensors includes a light source and a light detector, the light source and the light detector being disposed in alignment with one another transversely across and on diametrically opposite sides of the fluid flow rate measuring column.

11. A fluid flow tester for testing the flow rate of fluid from a device under test, which comprises:

an input port for receiving fluid from the device under test;

a drain port for draining fluid from the fluid flow tester;

a tubular fluid flow rate measuring column in fluid communication with the input port for measuring the flow rate of the fluid received by the fluid flow tester through the input port, the fluid flow rate measuring column defining an interior axial bore for the passage of fluid therethrough, the bore having a predetermined and known volume;

a plurality of sensors situated in proximity to and at least along a portion of the axial length of the fluid flow rate measuring column, the plurality of sensors including adjacent sensors, the adjacent sensors being spaced apart from each other by a predetermined distance along the axial length of the measuring column, the sensors detecting the flow of fluid through the fluid flow rate measuring column and generating signals in response thereto;

a circuit for measuring the time interval it takes for the fluid to flow from a first position in the measuring column which is in alignment with a first sensor of the plurality of sensors to a second position in the measuring column which is in alignment with a second sensor of the plurality of sensors which is adjacent to the first sensor, and for calculating the flow rate of the fluid in the measuring column based on the measured time interval and the known volume of the bore of the fluid flow rate measuring column;

a first valve, the first valve having a common port, an A port and a B port, the common port of the first valve being switchably fluidically interconnectable with the A port and the B port thereof; and a second valve, the second valve including a common port, an A port and a B port, the common port of the second valve being switchably fluidically interconnectable with the A port and the B port thereof;

the common port of the first valve being in fluid communication with the input port, the A port of the first valve being in fluid communication with the drain port, the B port of the first valve being in fluid communication with the B port of the second valve, the fluid flow rate measuring column including a first axial end and a second axial end situated axially opposite the first axial end, the common port of the second valve being in fluid communication with the first axial end of the fluid flow rate measuring column.

12. A fluid flow tester as defined by claim 11, which further comprises:

a third valve, the third valve having a common port, an A port and a B port, the common port of the third valve being switchably fluidically interconnectable with the A port and the B port thereof, the A port of the third valve being in fluid communication with the drain port, the common port of the third valve being in fluid communication with the second axial end of the fluid flow rate measuring column; and a fluid evacuation pump, the fluid evacuation pump having an output which is in fluid communication with the B port of the third valve.

13. A fluid flow tester as defined by claim 12, wherein each of the first valve, the second valve and the third valve being switchable between a first state and a second state, the common port of the first valve being fluidically interconnected to the A port of the first valve when the first valve is in the first state, the common port of the first valve being fluidically interconnected to the B port of the first valve when the first valve is in the second state, the common port of the second valve being fluidically interconnected to the A port of the second valve when the second valve is in the first state, the common port of the second valve being fluidically interconnected to the B port of the second valve when the second valve is in the second state, the common port of the third valve being fluidically interconnected to the A port of the third valve when the third valve is in the first state, the common port of the third valve being fluidically interconnected to the B port of the third valve when the third valve is in the second state.

14. A fluid flow tester as defined by claim 13, wherein the first valve is in the first state to define a bypass fluid flow path between the input port and the drain port.

15. A fluid flow tester as defined by claim 14, wherein the second valve is in the second state to prevent fluid flowing in the bypass fluid flow path from flowing through the second valve.

16. A fluid flow tester as defined by claim 14, wherein the third valve is in the second state to prevent fluid flowing in the bypass fluid flow path from passing through the third valve.

17. A fluid flow tester as defined by claim 13, wherein the first valve is in the second state, and the second valve is in the second state, the first valve and the second valve providing a fluid measurement flow path from the input port to the fluid flow rate measuring column to allow fluid to flow into the measuring column through the first axial end thereof.

18. A fluid flow tester as defined by claim 17, wherein the third valve is in the first state, the third valve allowing fluid flowing through the fluid flow rate measuring column and through the second axial end thereof to flow therethrough to the drain port.

19. A fluid flow tester as defined by claim 13, wherein the first valve is in the first state, the second valve is in the first state and the third valve is in the second state, and wherein the fluid evacuation pump provides air through the third valve to the fluid flow rate measuring column through the second axial end thereof to force fluid from the fluid flow rate measuring column, the second valve defining a fluid drain flow path between the fluid flow rate measuring column and the drain port, whereby fluid forced from the fluid flow measuring rate column flows through the second valve to the drain port along the fluid drain flow path.

20. A fluid flow tester as defined by claim 19, wherein the first valve when in the first state defines a fluid bypass flow path between the input port and the drain port.

21. A fluid flow tester as defined by claim 19, wherein the third valve, being in the second state, prevents the flow of fluid forced from the fluid flow measuring column from passing therethrough and diverting from the fluid drain flow path.

22. A fluid flow tester for testing the flow rate of fluid from a device under test; which comprises:

an input port for receiving therethrough fluid from the device under test, a drain port for draining fluid from the fluid flow tester;

a first tubular fluid flow rate measuring column and a second tubular fluid flow rate measuring column, each of the first and second measuring columns being selectively in fluid communication with the input port for measuring the flow rate of the fluid received by the fluid flow tester through the input port, each of the first and second fluid flow rate measuring columns defining an interior axial bore for the passage of fluid therethrough, each bore having a predetermined and known volume;

a plurality of sensors situated in proximity to and at least along a portion of the axial length of each of the first and second fluid flow rate measuring columns, the plurality of sensors including adjacent sensors, the adjacent sensors being spaced apart from each other by a predetermined distance along the axial length of each of the first and second measuring columns, the sensors detecting the flow of fluid through each of the first and second fluid flow rate measuring columns and generating signals in response thereto;

a plurality of valves in communication with at least one of the first fluid flow rate measuring column and the second fluid flow rate measuring column and with at least one of the input port and the drain port, the valves being controllable to direct the fluid to flow into the first fluid flow rate measuring column from the input port and simultaneously to direct fluid from the second fluid flow rate measuring column to the drain port, and being controllable to direct the fluid from the input port into the second fluid flow rate measuring column and simultaneously to direct fluid from the first fluid flow rate measuring column to the drain port; and a circuit for measuring the time interval it takes for the fluid to flow from a first position in the first measuring column which is in alignment with a first sensor of the plurality of sensors situated in proximity to the first measuring column to a second position in the first measuring column which is in alignment with a second sensor of the plurality of sensors situated in proximity to the first measuring column which is adjacent to the first sensor, and for calculating the flow rate of the fluid in the first measuring column based on the measured time interval and the known volume of the bore of the first fluid flow rate measuring column, and for measuring the time interval it takes for the fluid to flow from a first position in the second measuring column which is in alignment with a first sensor of the plurality of sensors situated in proximity to the second measuring column to a second position in the second measuring column which is in alignment with a second sensor of the plurality of sensors situated in proximity to the second measuring column which is adjacent to the first sensor of the plurality of sensors situated in proximity to the second measuring column, and for calculating the flow rate of the fluid in the second measuring column based on the measured time interval and the known volume of the bore of the second fluid flow rate measuring column.

23. A fluid flow tester as defined by claim 22, which further comprises:

at least one fluid evacuation pump, the at least one fluid evacuation pump being selectively in communication with at least one of the first fluid flow rate measuring column and the second fluid flow rate measuring column to force fluid therefrom.

\* \* \* \* \*